United States Patent [19]

Oho et al.

[11] Patent Number: 5,264,914
[45] Date of Patent: Nov. 23, 1993

[54] INTERFERENCE SENSOR AND METHOD UTILIZING EXTRACTED ALLIASING FREQUENCY COMPONENTS

[76] Inventors: Shigeru Oho, 17-2-301, Moriyama-cho 3-chome, Hitachi-shi, Ibaraki 316; Hisao Sonobe, 14-1-501, Aoba-cho, Katsuta-shi, Ibaraki 312; Junichi Makino, 3337-245, Nakane, Katsuta-shi, Ibaraki 312; Hiroshi Kajioka, C-4, 605, Nakanuki, Tsuchiura-shi, Ibaraki 300; Tatsuya Kumagai, 15-18-104, Hidaka-cho 3-chome, Hitachi-shi, Ibaraki 319-14, all of Japan

[21] Appl. No.: 11,833

[22] Filed: Feb. 1, 1993

Related U.S. Application Data

[63] Continuation of Ser. No. 662,637, Feb. 27, 1991, abandoned.

[30] Foreign Application Priority Data

Mar. 2, 1990 [JP] Japan ................................. 2-49396

[51] Int. Cl.⁵ .............................................. G01C 19/72
[52] U.S. Cl. ..................................... 356/350; 356/345
[58] Field of Search ............................... 356/345, 350; 250/227.19, 227.27

[56] References Cited

U.S. PATENT DOCUMENTS 4,779,975 10/1988 Kim ............................... 250/227.27
4,848,910 7/1989 Dupral ................................. 356/350

FOREIGN PATENT DOCUMENTS 4009933 10/1990 Japan ................................... 356/350

Primary Examiner—Samuel A. Turner
Attorney, Agent, or Firm—Antonelli, Terry, Stout & Kraus

[57] ABSTRACT

An interference sensor passes radiation from a source and a polariser to a loop of optical fiber so that radiation beams circulate in opposite directions around the loop and interfere. The loop contains an optical phase modulator which imposes an optical modulator on the radiation beams circulating on the loop. A converter detects the interfering and modulated beams and generates an interference signal which is then processed by an analyser. The interference in the loop is dependent on rotation of the loop and therefore analysis of the interference signal permits that rotation to be measured. In the present invention, the interference signal is (i) sampled at a frequency different from that of the optical modulation, or (ii) electronically modulated in the analyser at a frequency different from that of the optical modulation, or (iii) optically modulated in the loop at a second optical modulation frequency. The analysis in the analyser may be in the frequency domain (i.e. consideration being given to the frequency of the interference signal) or in the time domain (i.e. independent of frequency).

16 Claims, 18 Drawing Sheets

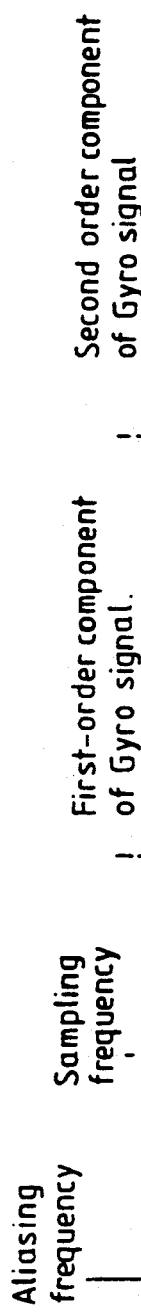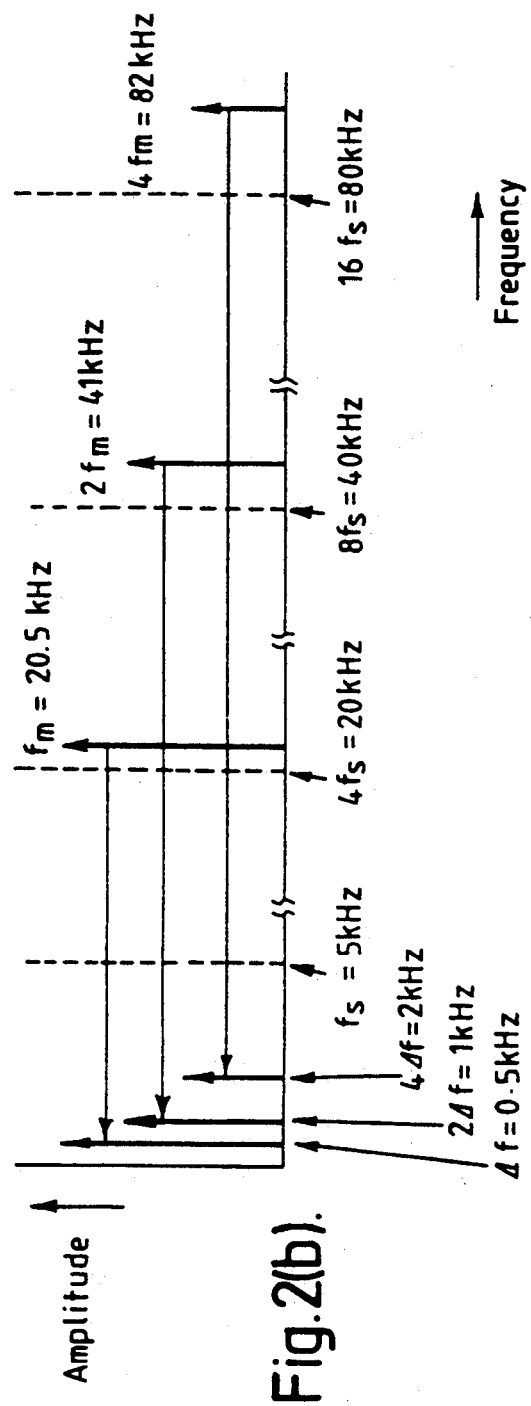
Fig.2(a)
Fig.2(b).

INTERFERENCE SENSOR AND METHOD UTILIZING EXTRACTED ALLIASING FREQUENCY COMPONENTS

This application is a continuation of application Ser. No. 07/662,637, filed Feb. 27, 1991, now abandoned.

BACKGROUND OF THE INVENTION

1. Field of the Invention

The present invention relates to an interference sensor for measuring a physical quantity. It is particularly, but not exclusively, concerned with an interference sensor being an optical gyroscope.

2. Summary of the Prior Art

It is well known to measure a physical quantity using a sensor in which two beams of light, or other radiation, are caused to interfere, with that interference being dependent on the physical quantity to be measured. Thus, optical gyroscopes are known in which two beams of light are caused to propagate in opposite directions through a loop of optical fibre. The two light beams will interfere when they emerge in opposite directions from the loop, and are caused to follow the same optical path. When the loop rotates, the propagation path lengths of the two light beams are changed, so that there is a change in the interference between the light beams. The rotational angular velocity can then be determined on the basis of changes in the phase difference between the interfering light beams.

There are two known systems for measuring the change in the phase difference of the interference. The first known system is known as the "closed loop" type, in which the loop contains additional means for varying the phase of the beams to maintain a constant phase difference therebetween. The detector, which detects the interfering beams, therefore detects a substantially constant phase difference, and the phase difference caused by rotation of the loop of the optical gyroscope is determined from the degree of adjustment needed within the loop itself.

The second system, known as the "open loop" type, directly detects changes in the phase difference between the interfering beams. The present invention is primarily concerned with this latter system.

It is also known to introduce an optical modulator into the optical system of the interference sensor, and to analyse changes in phase on the basis of that modulation. Various modulation systems are known, of which one type is phase modulation. Examples of such phase modulation are disclosed in U.S. Pat. Nos. 4,545,682, 4,634,282, 4,645,345, 4,687,330, 4,707,136, 4,728,192, and 4,765,739, and *Electronics Letters*, Vol. 19, No. 23, Nov. 10, 1983, pp. 997-999.

SUMMARY OF THE INVENTION

The present invention seeks to provide an interference sensor in which the interference signal from optically phase modulated interfering radiation beams is analysed, in a way which permits such analysis to be carried out rapidly.

In a first aspect, a Fourier line spectrum of the electronic interference signal measured by the detector receiving the interfering radiation beams is obtained, and one or more lines of that spectrum is compared with a sampling frequency at which the electronic interference signal is sampled. The comparison is on the basis of a frequency component corresponding to a difference relationship between the frequency of the one or more lines of the Fourier line spectrum and the sampling frequency. The present invention is concerned with an interference sensor according to the first aspect, an electronic analyser for such an interference sensor, a vehicle control system incorporating such an interference sensor, and a method of measuring a physical quantity using such an interference sensor.

The first aspect of the present invention is concerned with a sampling technique. However, the inventors of the present application have realised that the effect achieved by such sampling can also be achieved by electronically modulating the electronic interference signal from the detector which detects the interfering radiation beams, so that the analyser operates by investigating a property of a frequency component corresponding to a difference relationship between the frequency of at least one line of the Fourier line spectrum and the or each frequency of the electronic modulation, since it is possible to use an electronic modulation with more than one frequency component, such as a square wave, rather than a sinusoidal wave with a single frequency component. Such electronic modulation can be used in conjunction with sampling, but is an independent aspect of the present invention.

The inventors of the present application realised further that such electronic modulation was equivalent to optically phase modulating the interfering radiation beams by modulation at two frequencies. Then, a property of a frequency component corresponding to a difference relationship between the frequency of at least one line of the Fourier line spectrum and the frequencies of the two modulations is investigated. This is a third, independent, aspect of the present invention, although it may be combined with the first and/or second aspect.

In all such systems, and indeed in all the interference sensors of which the applicants are aware, consideration has been given to the frequency of the electronic interference signal from the detector which detects the interfering radiation beams. The processing is thus in the "frequency domain". However, the applicants have further realised that it is possible to analyse the phase modulated signal in the time-domain, i.e. independent of frequency. The value of a time-dependent feature of the electronic interference signal could then be obtained, such as the value of the peak-to-peak interval of the wave form, and variations in this value are directly related to changes in the interference relationship between the two beams. Thus, it is possible to measure a physical quantity on which those changes are based, by measurements in the time domain. This then represents a fourth independent aspect of the present invention, although time domain investigation may be combined with sampling, or with additional electronic or optical modulation.

With the present invention, the physical quantity which determines the changes in the phase relationship between the interfering radiation beams can be measured rapidly. The present invention is therefore applicable to the control of a vehicle in which changes in the movement of that vehicle are detected, and the subsequent movement of the vehicle is controlled on the basis of the movement already detected.

BRIEF DESCRIPTION OF THE DRAWINGS

Embodiments of the present invention will now be described in detail, by way of example, with reference to the accompanying drawings in which:

FIGS. 2(a)-2(b) are graphs illustrating the processing which can be carried out in the first embodiment;

DETAILED DESCRIPTION

Figure 1:
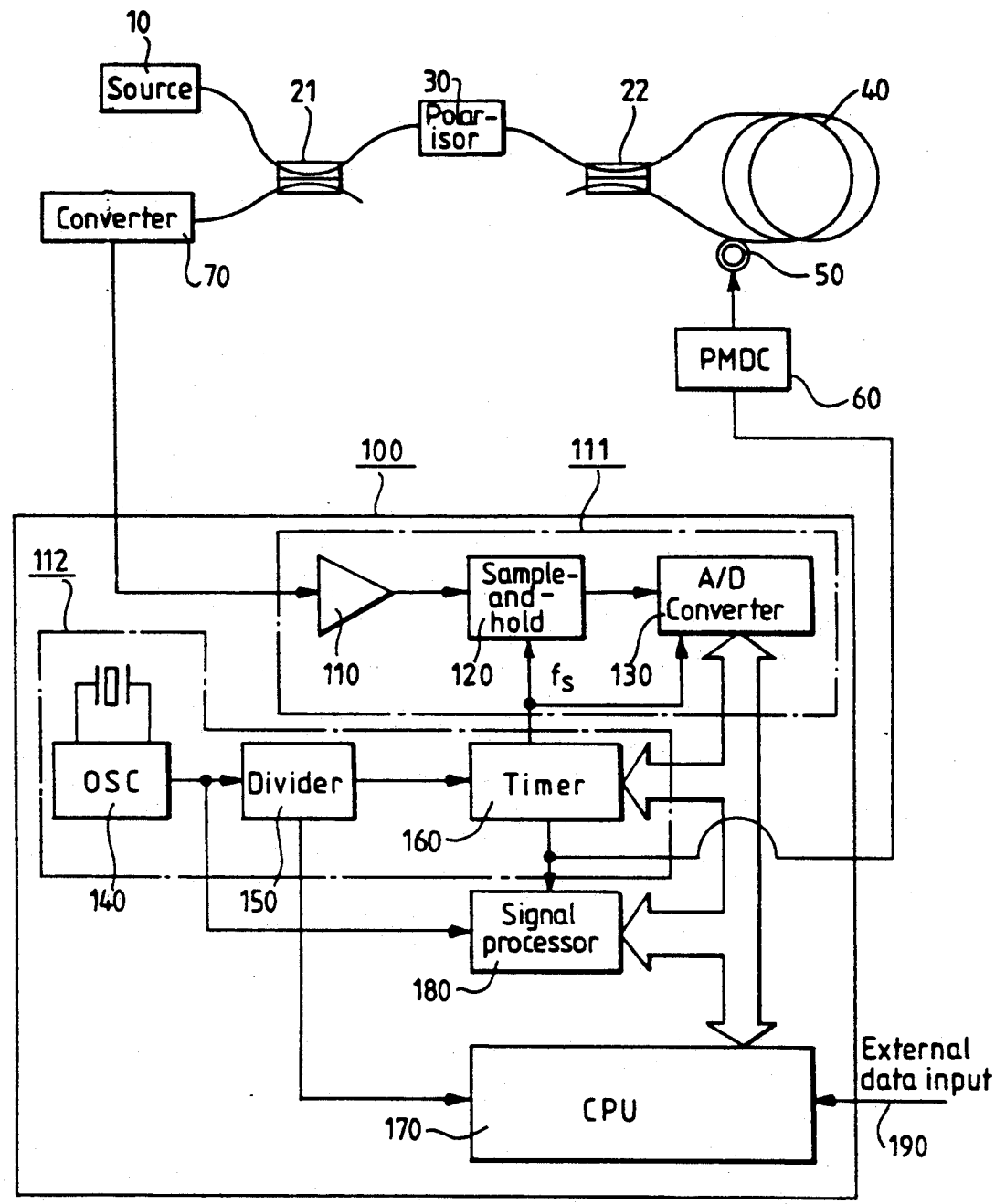
FIG. 1 shows schematically the general construction of an interference sensor according to a first embodiment of the present invention.

Before discussing embodiments of the present invention in detail, the general operation of an interference sensor, according to the present invention, will be discussed. As mentioned above, there are six different situations that need to be considered. Firstly, the present invention may operate in the frequency domain, in which case consideration is given to the frequency of the electronic interference signal of the detector. Then, when operating in the frequency domain, there are three possibilities. Firstly, handling methods can be used in which the signal is sampled at a suitable sampling frequency. Preferably, this frequency is less than the frequency of the signal, and therefore such an arrangement is referred to as a "down sampling method". However, it is also possible to use sampling frequencies which are higher than the frequency of the signal being measured. Secondly, it is possible to add to the optical modulation of the beams a second optical modulation, and such an arrangement will be referred to as "cross modulation". Thirdly, there is the possibility of adding an additional electronic modulation after detection of the interference beam, and such an arrangement will be referred to as "direct modulation". However, the present invention may alternatively operate in the time domain, in such cases it is again possible to use a sampling method, a method in which additional optical modulation is provided, and a method in which additional electronic modulation is provided.

The time waveform or frequency spectrum of a modulated interference signal is determined by the property of a modulation input signal (the time waveform or the frequency spectrum) and the phase difference of the light beams. Where the modulation input signal is a periodic signal and where the phase difference of the light beams has a constant value, the interference signal becomes a regular periodic signal. In principle, the phase difference of the light beams, which is related to a physical quantity to be detected by the interference sensor, can be measured by subjecting the waveform of one cycle of the interference signal to signal processing. However, when the interference signal is processed in real time, high-speed sampling and arithmetic circuits are needed.

In the interference sensor for an optical fiber gyro, etc., the phase difference of the light beams is a quantity fluctuating every moment, but it may normally be regarded as having a constant value, at least in the short term. For example, in an optical fiber gyro, the smoothing time of an output value is as long as several tens of msec. to several tens of sec. Consequently, in many applications of the optical fiber gyro, the light phase difference to be measured (herein, proportional to the angular velocity of rotation) may be considered to have a constant value for a period of time of several msec. to several tens of msec. This is evident when it is considered that the sudden changes in angular velocity are limited in a moving object such as an aircraft or a vehicle.

Assuming, for example, that the phase modulation signal of the optical fiber gyro is set at 20 kHz, it has a period of 50 $\mu$sec. Under the assumed condition that the light phase difference to be measured does not change for the period of time of several msec. or several tens msec., the waveform of the interference signal repeats a fixed shape over 100 or 1000 cycles. Therefore, when the interference signal waveform for such many cycles is to be handled, equivalent signal processing can be executed corresponding to a time signal whose period is extended. Accordingly, the requirements for the sampling frequency and the processing speed of the arithmetic circuit can be significantly reduced.

To obtain equivalent time (frequency domain) signal processing described above, a down sampling method can be used in which the interference signal is sampled at a frequency lower than a detection frequency. Further, when the equivalent time (frequency domain) interference signal waveform which is similar to the waveform of the interference signal in real time is composed using sampled values, the phase difference of the interference sensor is obtained from the equivalent time (frequency domain) interference signal. Alternatively, the phase difference can be obtained even when aliasing frequency components based on the sampling are extracted from the sampled values obtained by the down sampling method.

Alternatively, cross modulation methods may be used to achieve equivalent time (frequency domain) signal processing. Cross modulation uses a first modulation signal and a second phase modulation signal, to which modulation signals are added. The optical phase modulator acting on the light beams is driven with the sum signal. Thus, the low frequency components of an interference signal frequency spectrum produced by cross modulation may be detected, and extracted, and the result processed in equivalent time (frequency domain).

The third alternative is to use a direct modulation method, which extracts the frequency components of a mixed signal obtained by electrically multiplying the interference signal and a local oscillation signal generated by means of a mixer circuit.

The above discussion has been concerned with processing in the frequency domain, in order to obtain an equivalent time processing. It is also possible to measure the characteristic of the time waveform, to operate in the time domain. The interference signal has equal information in the light phase difference which is measured relative to the phase modulation, for both the time domain and the frequency domain. Therefore, it is possible to make use of the waveform moment in the time domain, as a characteristic variable of that waveform, and operate in the time domain, rather than considering lines in a Fourier spectrum when operating in the frequency domain.

Thus, in an interference measuring method operating in the time domain, the phase difference between the interfering waves can be determined by using time information from the time waveform characteristic points of the interference wave signal and calculating the phase difference between the interfering waves from the result of that measurement.

An interference sensor operating in the time domain may then extract the time waveform characteristic points of the interference wave signal and calculate the time intervals between the extracted waveform characteristic points or time intervals between the waveform characteristic points and specified time reference points associated with the interfering waves. From the calculated time intervals, it is possible to determine the phase difference between the interfering waves or a physical quantity represented by the phase difference.

Such an interference sensor may adjust the phase difference of interference between the interfering waves by phase-modulating the interference signal with an optical phase modulation, extract the time waveform characteristic points of the interference wave signal, which was formed of two phase-modulated interfering waves combined, and calculate the time intervals between the extracted waveform characteristic points or the time intervals between the waveform characteristic points and the specified time reference points of the phase modulation drive signal. To simplify the construction of and processing by the interference sensor, the optical phase modulation preferably uses a periodically recurring signal as the drive signal in phase-modulating the interfering waves. Also, for improved precision, it is desirable to compensate for the quantity of phase modulation on the basis of the quantity of phase modulation resulting from the optical phase modulation detected from the measured value of the time intervals.

It is also desirable that the maximum or minimum points of the time waveform of the interference signal or the center of the time waveform be used as the waveform characteristic points. It is further desirable for the simplified processing that the waveform characteristic points be distinguished according to their time intervals with respect to the specified time reference points.

The interference measurement may involve modulating the intensity of a wave source by using a locally oscillated signal, the locally oscillated signal having a frequency difference from that of the optical phase modulation drive signal and also having a frequency spectrum such that its amplitude characteristic is flat up to a specified high-order frequency component.

Embodiments of the present invention operating in either the time domain or the frequency domain will now be described. It should be noted that the present invention can make use of digital circuitry, which permits integration of the signal processing circuit, and also permits the present invention to make use of integrated circuit technology.

Thus the apparatus may be made small in size by implementing the signal processing circuit in the form of an LSI and may be used as a sensor for measuring rotational motion or as an azimuth sensor. This enables a vehicular control system of high precision to be constructed.

FIG. 1 shows an example of the general arrangement of a phase modulation type optical fiber gyro according to a first embodiment of the present invention.

A light beam from a light source 10 propagates via a first fiber coupler 21 and a polarizer 30 and reaches a second fiber coupler 22, in which the beam branches into two light beams that propagate through a fiber loop 40 respectively counterclockwise and clockwise. These light beams have their light phases modulated by a phase modulator (PM) 50 in accordance with a modulation signal generated by a phase modulator driver circuit (PMDC) 60. This imposes a primary modulation. Thereafter, the two beams reach the fiber coupler 22 and are recombined causing an interference beam to be generated. The interference beam passes from the fiber coupler 22 to the first fiber coupler 21 via the polarizer 30. In the first fiber coupler 21, the interference beam branches into two beams, one of which returns to the light source 10 and the other of which passes to a photoelectric converter circuit 70 employing a photodiode and is output as an interference signal therefrom. The interference signal is transmitted to a signal processing circuit 100 and is processed so as to extract the angular velocity of rotation of the optical fiber gyro.

Next, the interference signal will be explained. If the interference signal is denoted by P, it can be expressed by Eqs. (1) and (2) in accordance with the principle of interference:

$$P = K\{1 + \nu \cos\psi\} \quad (1)$$

$$\psi = \phi_S + \phi(t) - \phi(t-\tau) \quad (2)$$

Here, $\psi$ denotes the phase difference of the beams, K a coefficient which is proportional to the intensity of the beams and the gain of the photoelectric converter circuit, $v$ a transmission characteristic of the interferometer, and $\phi_S$ the Sagnac phase difference which is proportional to the rotational angular velocity of rotation. In addition, $\tau$ denotes the propagation delay time of the light wave which propagates through the fiber loop.

In this embodiment, a sinusoidal wave at a frequency $f_m$ is employed as the phase modulation signal. Assuming the characteristics of the phase modulator to be ideal, the interference signal P is as shown in Eq. (3):

$$P = K\{1 + v \cos(\phi_S - \phi_e \sin \theta)\} \quad (3)$$

$$\theta = w_m(t - \tau/2) \quad (4)$$

$$\phi_e = 2\phi_m \sin(w_m \sigma/2) \quad (5)$$

Here $\phi_e$ denotes the effective phase modulation index, $w_m = 2\pi f_m$ a modulation angular frequency, and $\phi_m$ a modulation amplitude.

The interference signal P in Eq. (3) is expanded into a Fourier series employing Bessel functions, and it becomes a line spectrum with lines at frequencies $f_m$, $2f_m$, $3f_m$, $4f_m$.... For the purpose of eliminating fluctuations in the light intensity coefficient K and the effective phase modulation index $\phi_e$ and then measuring the Sagnac phase difference $\phi_S$, the amplitudes of at least three of the lines of the spectrum need to be determined. In this embodiment, the first-order, second-order and fourth-order frequency components of the phase modulation are extracted from the interference signal by the signal processing circuit 100 to which the technique of equivalent time processing is applied. The arrangement and operation of the signal processing circuit 100 in this embodiment will be described below.

The arrangement of the signal processing circuit 100 may be divided into the following four sections: a sampling circuit 111 which samples the photoelectrically-converted interference signal and converts the sampled signal into a digital signal; a timer circuit 112 which generates timing signals for the sampling time, processing time, etc; a digital signal processor 180 which executes digital processing on the results of the sampling, so as to determine the angular velocity of rotation; and a control circuit or microcomputer 170 which controls the sampling circuit and the arithmetic processing circuit.

The processing circuit 100 is thus relatively simple, and the signals at lower frequencies corresponding to the interference signal can be obtained by sampling the interference signal at a sampling frequency different, e.g., lower, than the frequency of the interference signal. This gives the advantage that neither high-speed sampling processing nor a high-speed A/D converter is required.

The sampling circuit 111 has an input buffer 110 which receives the interference signal and adjusts the signal level thereof, a sample-and-hold circuit 120 which samples the output signal of the input buffer at a predetermined frequency $f_s$, and an A/D converter 130 by which the signal from the sample-and-hold circuit is converted into a digital signal.

The timer circuit 112 includes a crystal oscillator (OSC) 140, a frequency divider 150 which is formed, e.g., by a high-speed TTL device and which divides the frequency of the output signal of the oscillator 140, and a programmable timer 160 which receives a clock signal produced by the frequency division of the frequency divider 150. This timer 160 supplies the sampling circuit, the digital signal processor 180 and a microcomputer (CPU) 170 with clock signals respectively corresponding thereto.

The programmable timer 160 operates with reference to the clock signal which is fed from the frequency divider 150. Thus, a pulse signal is generated at a predetermined frequency $f_s$, and is applied to the sample-and-hold circuit 120 and the A/D converter 130 as a sampling timing. The sample-and-hold circuit 120 and the A/D converter 130 perform the above-described operations of sampling and holding the interference signal and A/D converting the sampling timing at the sampling frequency $f_s$.

The programmable timer 160 generates a square wave signal at the frequency $f_m$ of the primary modulation and supplies that square wave to the phase modulator driver circuit 60. The phase modulator driver circuit 60 has a filter circuit, and a transistor buffer circuit which drives the phase modulator 50 as a capacitive load. In such a phase modulator driver circuit 60, the higher harmonic components of the square wave signal received from the programmable timer 160 are removed by filtering by a filter circuit, and a substantially sinusoidal signal at the frequency $f_m$ is set as the primary modulation signal so as to drive the phase modulator 50.

The microcomputer 170 is connected through a bus line with the programmable timer 160, A/D converter 130 and digital signal processor 180. The oscillation operation of the programmable timer 160 is controlled by the microcomputer 170. The sampling frequency $f_s$ and the phase modulation frequency $f_m$ are set by the microcomputer 170. The microcomputer 170 monitors the A/D conversion operation of the A/D converter 130, and it senses the end of the A/D conversion after receiving the sampling timing signal from the programmable timer 160. The interference signal converted into a digital code by the A/D converter 130 is read out of this A/D converter 130 as interference signal data every sampling step by the microcomputer 170. The microcomputer 170 transfers the interference signal data to the digital signal processor 180. Since the production of the interference signal data by the A/D converter 130 is synchronous with the sampling timing, the data transfer is also performed at the same frequency as the sampling frequency $f_s$.

On receiving the interference signal data from the microcomputer 170, the digital signal processor 180 extracts the component at the phase modulation frequency $f_m$, the component at the second-order harmonic $2f_m$ and the component at the fourth-order harmonic $4f_m$, which components are contained in the interference signal. In this embodiment, the equivalent time signal processing is carried out in accordance with the present invention using the techniques referred to above as "down sampling". More specifically, the aliasing signal components $\Delta f$ etc. of lower frequencies corresponding to the phase modulation frequency components are extracted by using the relationships of Eqs. (6)–(8) below which are expressed in terms of the sampling frequency $f_s$ and the phase modulation frequency $f_m$.

$$\Delta f = f_m - nf_s \quad (6)$$

$$2\Delta f = 2f_m - 2nf_s \qquad (7)$$

$$4\Delta f = 4f_m - 4nf_s \qquad (8)$$

In these equations, n is an integer.

The above situation is illustrated in FIG. 2 (a). The generation of the aliasing frequencies resembles the principle of a stroboscope or a sampling scope. It should be noted that $f_s$ may be greater or less than $f_m$, although only the latter case will be discussed in detail below. By digital calculations based on the interference signal data received, the digital signal processor 180 extracts the value of $\Delta f$, $2\Delta f$ and $4\Delta f$ frequency components in place of the frequencies $f_m$, $2f_m$ and $4f_m$. The filter calculations in this embodiment will be described below.

Figure 3:
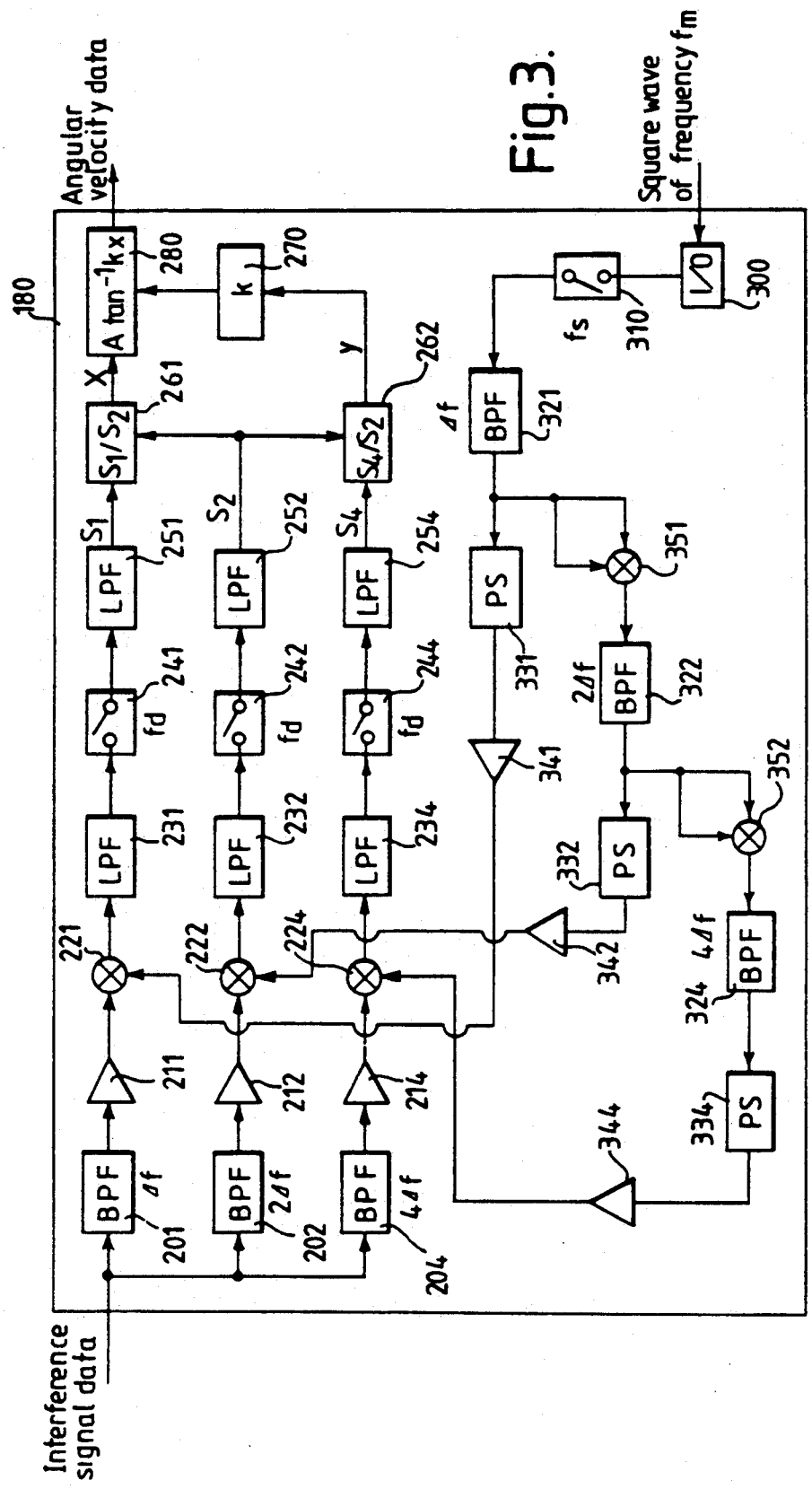
FIG. 3 is a detailed block diagram of an arithmetic processing circuit.

FIG. 3 is a block diagram of the digital arithmetic processing which is executed in the digital signal processor 180. Individual functional blocks are preferably achieved by suitable software, but dedicated circuits may be used.

The interference signal data items from the microcomputer 170 are input to band-pass filters 201, 202 and 204 of center frequencies $\Delta f$, $2\Delta f$ and $4\Delta f$ previously set by the microcomputer and are extracted as the first-order, second-order and fourth-order component signals, respectively. Amplifiers 211, 212 and 214 amplify the respective signals to suitable magnitudes. At this stage, the respective signals contain, not only the principle components of the corresponding frequencies $\Delta f$, $2\Delta f$, and $4\Delta f$, but also noise and other frequency components which have not been completely suppressed by the band-pass filters 201, 202, and 204. Multipliers 221, 222 and 224 detect the respective signals of the first-order, second-order and fourth-order components at high sensitivities by a lock-in operation. More specifically, the first-order component signal from the amplifier 211, for example, is multiplied by the first-order reference signal of a frequency $\Delta f$ in the multiplier 221. As a result, the output signal of the multipler 221 has a component of frequency $2\Delta f$ and D.C. components and other noise frequency components. The D.C. component is extracted from these components by a low-pass filter 231.

The above lock-in operation is similar for the second-order and fourth-order component signals. The multiplier 222 and a low-pass filter 232 constitute a lock-in detector for the second-order frequency $2\Delta f$. Therefore, the second-order reference signal of the frequency $2\Delta f$ is input to the multiplier 222. Likewise, the multiplier 224, and a low-pass filter 234 constitute a lock-in detector for the fourth-order frequency $4\Delta f$, and the fourth-order reference signal of a frequency $4\Delta f$ is used.

In this embodiment, however, it is sometimes difficult to produce suitable low-pass filters in the form of digital filters for the sampling frequency. In this embodiment, therefore, the low-pass filters 231, 232 and 234 are succeeded by diminution sampling units 241, 242 and 244 as shown in FIG. 3. The diminution sampling units 241, 242 and 244 sample input data at a frequency $f_d$. The diminution frequency $f_d$ should normally be lower than the sampling frequency $f_s$ and higher than the frequency response to be achieved by the optical fiber gyro.

Low-pass filters 251, 252 and 254 subject the output data of the respective diminution sampling units 241, 242 and 244 to filtering. Accordingly, the first-order D.C. signal $S_1$, second-order D.C. signal $S_2$ and fourth-order D.C. signal $S_4$ which are the outputs of the low-pass filters 251, 252 and 254 are proportional to the amplitudes of the $\Delta f$, $2\Delta f$ and $4\Delta f$ frequency components contained in the interference signal data items, respectively. The $\Delta f$, $2\Delta f$ and $4\Delta f$ frequency components in the interference signal data items are the reflexes of the phase modulation frequency $f_m$ and the higher harmonic components $2f_m$ and $4f_m$ thereof which are originally contained in the interference signal, so that the D.C. signals $S_1$, $S_2$ and $S_4$ are proportional to the amplitudes of the $f_m$ and $2f_m$ and $4f_m$ frequency components in the interference signal respectively.

The D.C. signals $S_1$, $S_2$ and $S_4$ are input to dividers 261 and 262, by which the first ratio signal $x = S_1/S_2$ and the second ratio signal $y = S_4/S_2$ are respectively output. The second ratio signal y is a variable dependent upon only the effective phase modulation index $\phi_e$ of Eq. (5), and is expressed by Eq. (9):

$$y = J_4(\phi_e)/J_2(\phi_e) \qquad \ldots (9)$$

The first ratio signal x is expressed by Eq. (10) with the Sagnac phase difference $\phi_S$:

$$k\, x = \tan \phi_S \qquad \ldots (10)$$

$$k = J_1(\phi_e)/J_2(\phi_e) \qquad \ldots (11)$$

The constant k in Eq. (11) is determined by only the effective phase modulation index $\phi_e$. In Eqs. (9) and (11), $J_n (n = 1, 2, 4)$ denotes a Bessel function of the first kind of order n.

The effective phase modulation index $\phi_e$ fluctuates in dependence on the voltage amplitude of the drive signal produced by the phase modulator driver circuit 60, and in addition, on the characteristics of the phase modulator 50 itself. Consequently, the constant k of Eq. (11) also fluctuates. The second ratio signal y compensates for the fluctuations of the effective phase modulation index $\phi_e$. When the index $\phi_e$ is obtained from the value of the signal y in accordance with Eq. (9), the constant k can be determined by Eq. (11). The relationship between the second ratio signal y and the constant k need not be calculated on each occasion, but the corresponding values thereof can be found by tabulating them in advance. A look-up table 270 stores the relationship between the parameters y and k, and it generates the constant k in response to a y input.

An angular velocity calculator 280 receives the first ratio signal x from the first divider 261 and the constant k from the look-up table 270, and calculates the rotational angular velocity, $\Omega$, in accordance with Eq. (12) and delivers it as an output:

$$\Omega = A \tan^{-1} k\, x \qquad \ldots (12)$$

where the constant A is given by $$A\, \phi_S = \Omega \qquad \ldots (13)$$

and it is stored in accordance with the angular velocity calculator 280.

Next, the generation of the first-order, second-order and fourth-order reference signals will be discussed. As explained before, the reference signal whose frequency is equal to the signal frequency to be detected is required for lock-in detection. In this embodiment, the reference signals are generated by sampling a square wave signal which is synchronous with the phase modulation signal.

The square wave signal of frequency $f_m$ generated by the programmable timer 160 is supplied to the digital signal processor 180 as shown in FIG. 1, and is applied to a digital input terminal 300 as shown in FIG. 3. A sampling circuit 310 checks the input state of the input terminal 300, whereupon it provides a numerical value +1 for an input of high level and numerical value −1 for an input of low level. Checking of the input to the input terminal by the sampling circuit 310 is performed every time there is an input of interference signal data. Accordingly, the sampling circuit samples the input signal at a period corresponding to the sampling frequency $f_s$ and produces a square wave at values +1 or −1.

The sampling operation of the sampling circuit 310 causes the reflex frequency $\Delta f$ based on Eq. (6) to appear at the output of the sampling circuit 310. A band-pass filter 321 extracts the reflex frequency component $\Delta f$ from the output signal of the sampling circuit 310. The signal at frequency $\Delta f$ derived by the band-pass filter 321 has its phase adjusted by a phase shifter 331 and has its amplitude set to an appropriate value by an amplifier 341. The resulting signal is used as the first-order reference signal.

In the operations discussed above, the phase adjustment by the phase shifter 331 is important for enhancing the sensitivity of lock-in detection. Thus, the first-order reference signal is adjusted so as to be substantially in phase with the first-order component signal to be detected in the multiplier 221, to make optimum the sensitivity of lock-in detection. Simultaneously, the plus or minus polarity of the angular velocity data for counter-clockwise rotation is determined.

In lock-in detection, the reference signal must have a fixed phase relative to the input signal. If this does not happen, the D.C. signal level and polarity of lock-in detection output change with the phase. In this embodiment, all timing operations are derived from the crystal oscillator 140 and the programmable timer 160, and phase relationships do not change.

The generation of the second-order and fourth-order reference signals are similar to that of the first-order reference signal described above. In order to produce the signal of the frequency $2\Delta f$, however, the output signal of the band-pass filter 321 is multiplied by an integer by a multiplier 351. A band-pass filter 322 extracts the components of frequency $2\Delta f$ from the integral-times output of the multiplier 351, and the component of frequency $4\Delta f$ is derived from the product by a multiplier 352 and a band-pass filter 324. The operations of phase shifters 332, 334 and amplifiers 342, 344 are the same as for the first-order reference signal.

When the apparatus is operated with the above arrangement, the interference signal can be sampled at a frequency lower than that of the interference signal, and the sampled signal may be processed by an A/D converter of low operating speed. Therefore, an A/D converter of high speed and high cost is unnecessary, permitting savings in cost and size. Furthermore, the required number of sampling data decreases, and the time required for calculations, etc., may be shortened, to give the advantage that the accuracy of the processing can be enhanced and the time of procesing can be shortened.

Next, a practical example of the above embodiment will be described.

First, the frequency response characteristic of the optical fiber gyro is set at 30 Hz, and an A/D converter of 12 bits is employed as the A/D converter 130. The crystal oscillator 140 employed produces a frequency of 40 MHz, which is divided into clock signals at 2.5 MHz of 1/16 frequency and of 5 MHz of ⅛ frequency by the frequency divider 150, the clock signals being respectively fed to the programmable timer 160 and the microcomputer 170. In addition, a clock signal at a frequency of 40 MHz is fed to the digital signal processor 180. Since the microcomputer 170 has a data bus of 8 bits, data is transferred at two divided steps each handling one byte.

When the phase modulation frequency is about 20.5 kHz and the sampling frequency is set at 5 kHz, the value of n is given as n=4 which is the closest value to the phase modulation frequency, in accordance with Eqs. (6) to (8). With the above setting, the reflex frequency components of the fundamental wave component $f_m$, second-order harmonic component $2f_m$ and fourth-order harmonic component $4f_m$ of the interference signal appear as $\Delta f=0.5$ kHz, $2\Delta f=1$ kHz and $4\Delta f=2$ kHz as illustrated in FIG. 2 (b).

In order to extract the reflex frequency components from the interference signal and on the basis of the commands of the microcomputer 170, the interference signal data items are passed through the band-pass filters 201, 202 and 204 of the digital signal processor 180 whose center frequencies are pre-set at frequencies $\Delta f$, $2\Delta f$ and $4\Delta f$. In this example, the digital signal processor 180 is operated by a clock signal of 40 MHz, so that a multiplication and an addition can be processed once in 100 nsec. Since the sampling frequency is 5 kHz (a period of 200 u sec.), filter calculations based on at most 2000 multiplications and additions are possible.

However, the outputs of the band-pass filters 201, 202 and 204 contain not only the components of the signal frequencies $\Delta f$, $2\Delta f$ and $4\Delta f$ but also other frequency components and noise. The $\Delta f$, $2\Delta f$ and $4\Delta f$ components are therefore detected at high sensitivities by the lock-in operation, using the multipliers 221, 222 and 224 and the reference signals (the output signals of the components 341, 342 and 344) equal to the signal frequency components. Subsequently, the cut-off frequencies of the low-pass filters 231, 232 and 234 are set at 200 Hz, and D.C. components proportional to the center frequency components of the corresponding band-pass filters are extracted.

It is difficult, however, to achieve a low-pass filter having the cut-off frequency of 30 Hz in the form of a digital filter when the sampling frequency $f_s$ is set at 5 kHz. The reason is that the digital signal processor 180 used in this example executes a floating point calculation having a mantissa part of 4 bits and an exponent part of 6 bits, and the finite calculation makes it difficult to fabricate the filter whose cutoff frequency is very different from the sampling frequency. In this example, therefore, the diminution sampling units 241, 242 and 244 are placed behind respective low-pass filters 231, 232 and 234. These diminution sampling units 241, 242 and 244 are set at a frequency $f_d=500$ Hz. Each of the diminution sampling units 241, 242 and 244 delivers one output data item for ten input data items so that the sampling rate of the output data is changed from 5 kHz to 500 Hz.

The frequency response of the optical fiber gyro is set at 30 Hz. Therefore, frequency components of and above 30 Hz which are contained in the D.C. signals which are the outputs of the diminution sampling units are eliminated by the low-pass filters 251, 252 and 254.

The outputs of the low-pass filters 251, 252 and 254 are processed by the dividers 261 and 262. The processed results are input to the angular velocity calculator 280 and are changed into a rotational angular velocity measurement.

Thus, the angular velocity of rotation is obtained with high precision.

An optical phase modulator having a structure in which an optical fiber is wound around a piezo-ceramic cylinder may be used in the present invention. In a phase modulation type optical fiber gyro, a phase modulator of this type has a mechanical resonance frequency $f_r$ which is determined by the dimenions and material of the piezo-ceramic cylinder. The phase modulation frequency $f_m$ is usually set in the vicinity of the mechanical resonance frequency $f_r$. The voltage amplitude of the phase modulation signal can be reduced by utilizing mechanical resonance.

In order to attain a predetermined phase modulation amplitude, the voltage amplitude of the phase modulation signal may be adjusted. Since, however, the mechanical resonance is used in the phase modulator, the phase modulation amplitude depends greatly upon the modulation frequency $f_m$. For this reason, the frequency with which the voltage amplitude of the phase modulation signal reaches an appropriate level and which can mitigate modulation distortion and fluctuation in a modulation characteristic needs to be selected as the phase modulation frequency $f_m$.

Nevertheless, even when the piezo-ceramic cylinders for use in the phase modulators are baked with the same dimensions and under the same conditions, there is normally a wide variation in the mechanical resonance characteristics. Thus, the phase modulation frequency $f_m$ differs from one phase modulator to another. In order to bring the mechanical resonance frequency $f_r$ to a predetermined value, it is known to polish the piezo-ceramic cylinder to achieve a suitable adjustment. The need for this polishing step is a serious obstacle to a reduction in the fabrication cost of the optical fiber gyro.

In this embodiment, as shown in FIG. 1, the microcomputer 170 is provided with means 190 for receiving external data, thereby making it possible to set the phase modulation frequency $f_m$ at an optimum value in accordance with the mechanical resonance characteristic of each individual phase modulator 50. Hence, the microcomputer 170 receives the phase modulation frequency $f_m$ in the form of data from means 190 and controls the programmable timer 160 so as to generate a square wave signal of this frequency. Similarly, the microcomputer 170 receives the sampling frequency $f_s$ in the form of data from the means 190 and controls the programmable time 160 so as to generate the pulses at the sampling timings of this frequency. In this embodiment, the setting of the data of the phase modulation frequency $f_m$ and sampling frequency $f_s$, with which the reflex frequencies $\Delta f$, $2\Delta f$ and $4\Delta f$ determined by Eqs. (6) to (8) have predetermined values, is achieved using the means 190 to control the microcomputer 170. Accordingly, the filter processing steps of the digital signal processor 180 in FIG. 3 for the frequencies $\Delta f$, $2\Delta f$ and $4\Delta f$ become arithmetic processing steps which use the same filter coefficients at all times without regard to the value of the phase modulation frequency $f_m$.

The means 190 described above may provide the microcomputer 170 with either the phase modulation frequency $f_m$ or the sampling frequency $f_s$. The other frequency may be calculated from the one provided, by the microcomputer 170 in accordance with Eq. (6) under the condition that the reflex frequency $\Delta f$ is held constant. The reflex frequencies $\Delta f$, $2\Delta f$ and $4\Delta f$ can be altered so as to satisfy Eqs. (6) to (8) so that the phase modulation frequency $f_m$ is provided as external data and the sampling frequency is held at a constant value. In this case, the filter calculations of the digital signal processor 180 need to change calculation coefficients in accordance with the alterations of the frequencies $\Delta f$, $2\Delta f$ and $4\Delta f$, and the microcomputer 170 instructs the digital signal processor 180 to change the calculation coefficients.

As stated above, the influence of the different characteristics of the phase modulators can be corrected by the means 190 for receiving external data so that the phase modulator 50 need not be of high precision and can have its cost minimized.

Figure 4:
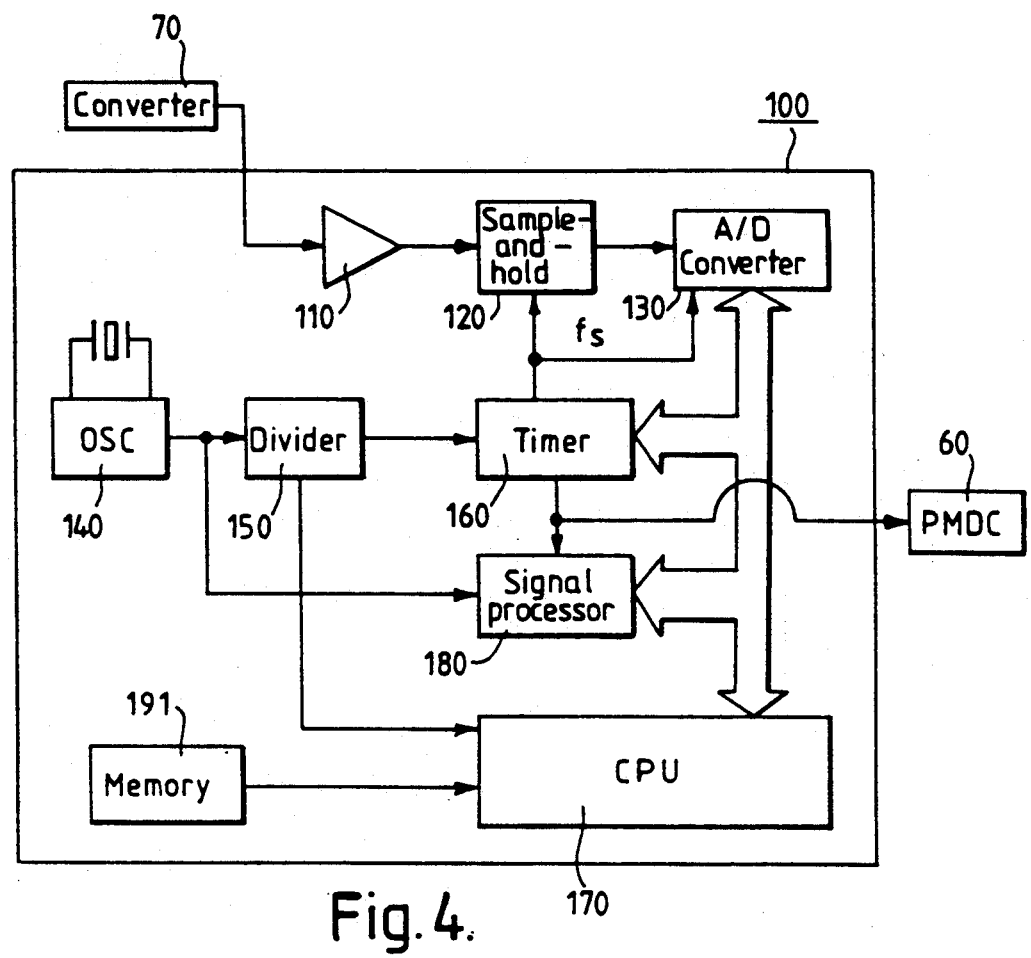
FIG. 4 shows a signal processing circuit, being part of a second embodiment of the present invention.

FIG. 4 shows a second embodiment of the present invention. The second embodiment differs from the first embodiment only in the method of supplying the external frequency data. Apart from this, other parts of this embodiment are similar to those of the embodiment of FIG. 1 and the same reference numerals are used. However, the second embodiment is furnished with a rewritable nonvolatile memory device 191. Data items representing the phase modulation frequency $f_m$ and sampling frequency $f_s$ which are set as appropriate for every phase modulator are recorded in the memory device 191. The microcomputer 170 reads out the frequency data from the nonvolatile memory device 191 at the resetting of power-ON, and controls the operation of the programmable timer on the basis of the data items calculation. Similarly, either the reflex frequency or the sampling frequency may be fixed. The data which are set as appropriate for each individual phase modulator are recorded in the nonvolatile memory device 191.

In this manner, once the optimum values corresponding to the characteristics of the phase modulator 50 have been recorded in the nonvolatile memory device 191 it is not necessary to supply input data each time the apparatus is switched on, and the labor of the input operation can be saved.

Figure 5:
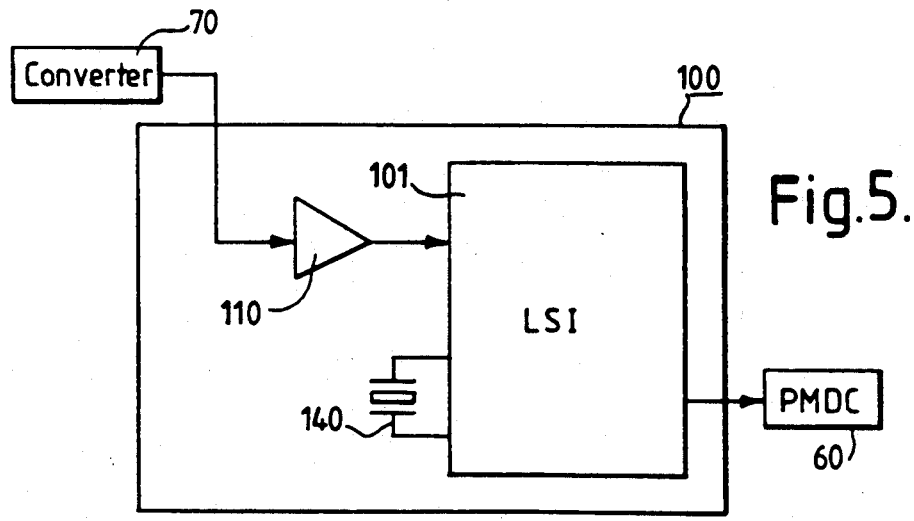
FIG. 5 shows a signal processing circuit, being part of a third embodiment of the present invention.

FIG. 5 shows a third embodiment of the present invention. In each of the first and second embodiments, the sampling means, timing generation means, arithmetic means and control means are shown as individual functional elements. The third embodiment uses a signal processing LSI 101 in which these elements are integrated on a single substrate. The signal processing LSI 101 includes therein a sample-and-hold circuit and an A/D converter as the sampling means, a digital numerical operation circuit as the arithmetic means, and a logical operation circuit and a memory circuit as the control means. Part of the memory circuit is a rewritable nonvolatile memory, in which data appropriate for each phase modulator is recorded. The control of the timing generation means and the transfer of the interference signal data by the control means, the generation of the phase modulation signal and sampling timings by the timing generation means, and the digital calculation processing of the interference signal by the arithmetic means are the same as in the first embodiment.

By constructing the detection circuit in the form of a single LSI as described above, the detector can be reduced in size, and the range of applications of the optical fiber gyro may be expanded.

Figure 6:
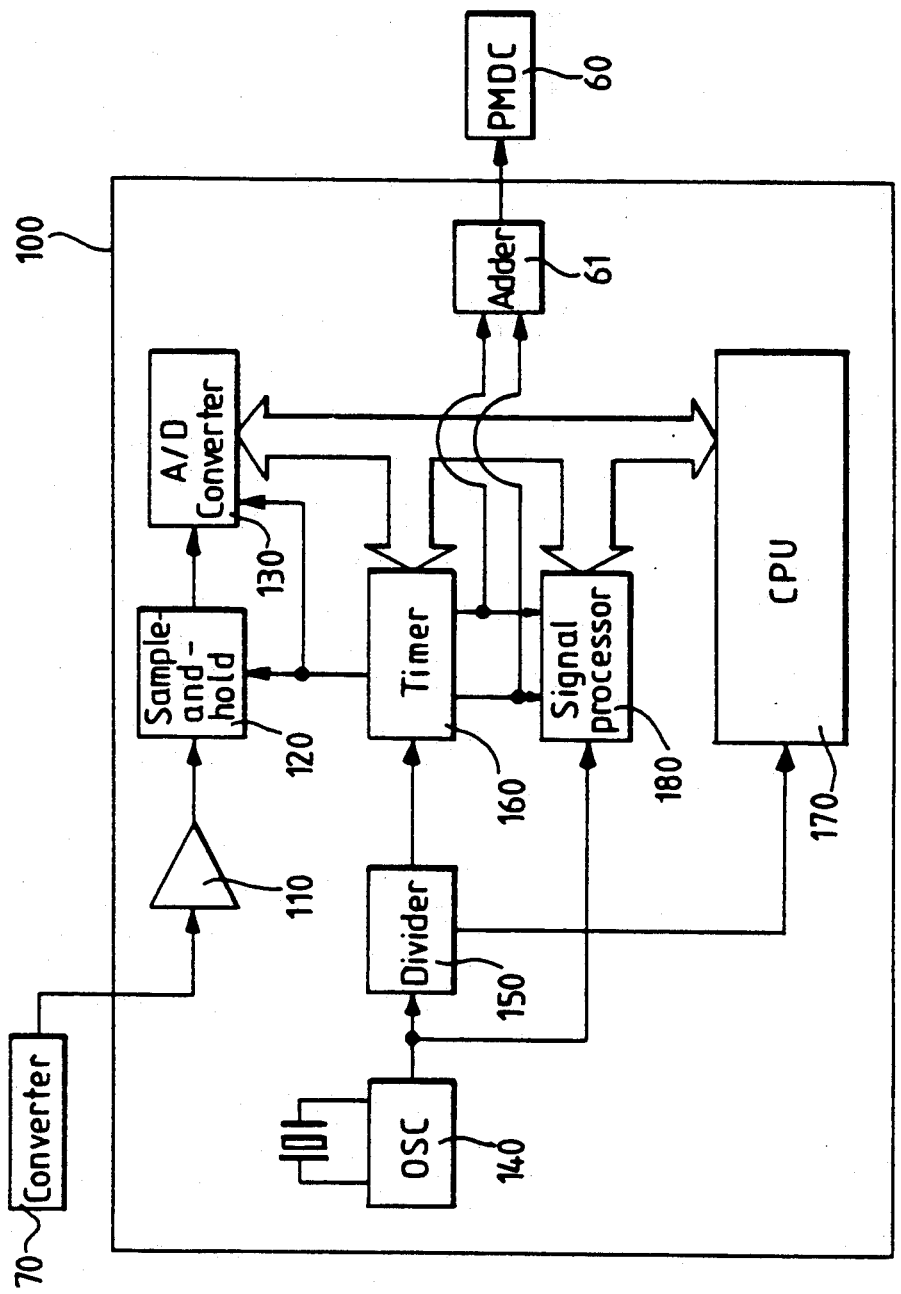
FIG. 6 shows a signal processing circuit, being part of a fourth embodiment of the present invention.

FIG. 6 shows a fourth embodiment of the present invention. In the fourth embodiment, the operations of the programmable timer 160 and digital signal processor 180 are somewhat difference from those in the first embodiment, and a signal adder circuit 61 is included as will be described. The other components are the same as in the first embodiment, and the same reference numerals are used.

In the fourth embodiment, the programmable timer 160 generates a first square wave signal of a frequency $f_{m1}$ and a second square wave signal of a frequency $f_{m2}$. These signals are input to the signal adder circuit 61, and the sum thereof is supplied to the phase modulator driver circuit 60. Accordingly, the phase modulator 50 is driven by a phase modulation signal which has both the frequencies $f_{m1}$ and $f_{m2}$ as its frequency components. First and second square wave signals are fed to the digital signal processor 180, and they are utilized for lock-in detection of the frequency components in the same manner as in the first embodiment.

In consequence of cross modulation based on the two frequencies there is an interference signal spectrum with the frequencies $f_{m1}$, $f_{m2}$ and the higher harmonic components thereof, together with the beat frequency of Eq. (14) and the higher harmonic components thereof:

$$B = f_{m1} - f_{m2} \quad \ldots (14)$$

In this embodiment, the beat frequency and the higher harmonic components thereof are used for detection and correction of the Sagnac phase difference. Also, reflex frequencies produced by "down sampling" are used. The reflexes of the first and second frequencies $f_{m1}$ and $f_{m2}$ based on "down sampling" appear as:

$$\Delta f = f_{m1} - f_s \quad \ldots (15)$$

$$\Delta f + B = f_{m2} - f_s \quad \ldots (16)$$

In this embodiment, the Sagnac phase difference using the beat frequency components of lower frequencies as described above, so that the requirements of frequency characteristics at the input ends of the input buffer 110 and sample-and-hold circuit 120 can be mitigated. However, high frequencies may also be used. Since the first embodiment uses the reflex of the fourth-order higher harmonic component of the phase modulation frequency, response of the circuitry is required up to the frequency of the fourth-order higher harmonic component at stages previous to the completion of the sampling. In contrast, in this embodiment, the frequencies of the beat frequency components suffice, and the frequency characteristics of the input buffer 110 and sample-and-hold circuit 120 can be relieved.

Figure 7:
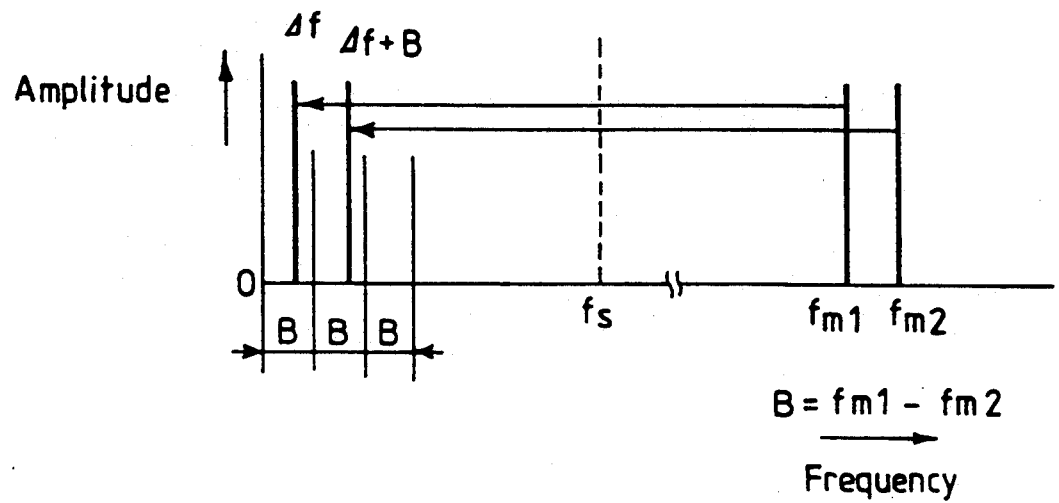
FIG. 7 is a graph showing processing which occurs in the fourth embodiment of the present invention.

As in the first embodiment, lock-in detection is used to extract the frequency spectrum components by the digital signal processor 180. The arrangements and operations of the lock-in detectors are the same as in the first embodiment, and only the frequencies of the reference signals are different. Thus, as illustrated in FIG. 7 the beat frequency B, reflex frequency $\Delta f$ and sum frequency $\Delta f + B$, and the higher harmonics thereof are needed.

Figure 8:
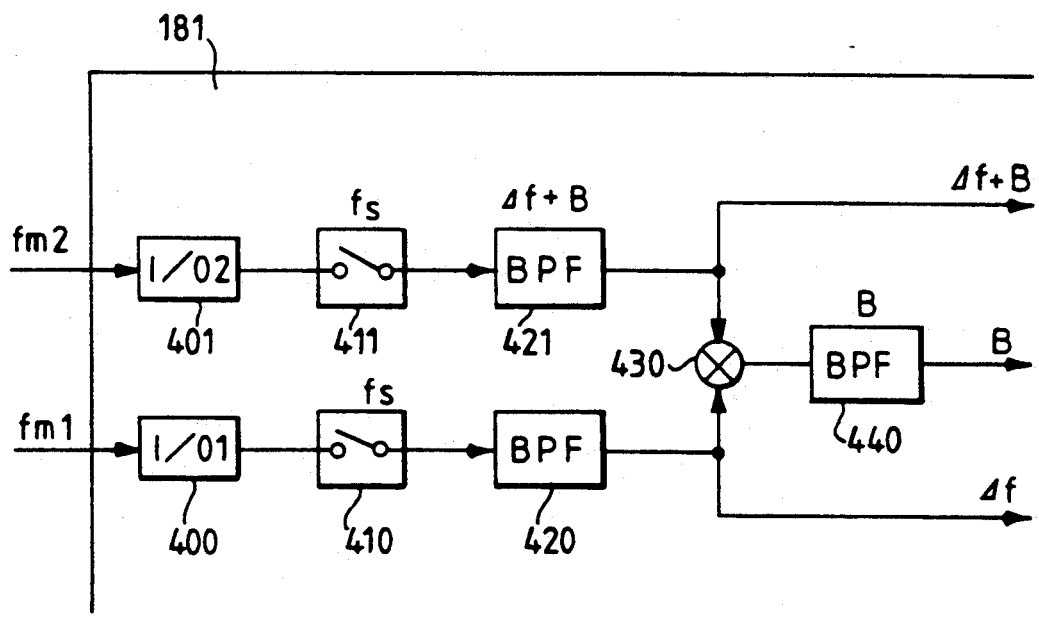
FIG. 8 is a block diagram illustrating the production of reference signal frequencies.

Referring now to FIG. 8, methods for producing the reference signal frequencies will be described.

The first and second square wave signals of frequencies $f_{m1}$ and $f_{m2}$ are respectively supplied to digital input terminals 400 and 401 of the digital signal processor 180. As in the first embodiment, sampling circuits 410 and 411 refer to these signal inputs with the sampling frequency $f_s$ and generate numerical sequences of $+1$ and $-1$ in accordance with the input logic levels. The numerical sequences are respectively input to band-pass filters 420 and 421 having $\Delta f$ and $\Delta f + B$ as their center frequencies whereby signals of frequencies $\Delta f$ and $\Delta f + B$ are produced. In addition, these signals are multiplied by each other using a multiplier 430, and a signal corresponding to the difference frequency B between the signals is derived using a band-pass filter having B as its center frequency. As in the first embodiment, these signals of the respective frequencies are multiplied by integers so as to generate higher harmonic components, and they are converted into reference signals of appropriate amplitude levels and phase by phase shifters and amplifiers.

Next, a specific example of the fourth embodiment will be described. First, if the first modulation frequency $f_{m1}$ is set at 20.5 kHz and the second modulation frequency $f_{m2}$ at 21.5 kHz, the beat frequency B becomes 0.75 kHz in accordance with Eq. (14). The frequency spectrum of the interference signal is shown in FIG. 7. In this figure, assuming the sampling frequency $f_s$ to be 5 kHz, the reflex frequency component $\Delta f$ of the first modulation frequency $f_{m1}$ becomes 0.5 kHz, and the reflex frequency component $\Delta f + B$ of the beat frequency component (the second modulation frequency component $f_{m2}$) becomes 1.25 kHz. When the beat frequency component is used in this manner, the frequencies need not be handled up to the fourth-order higher harmonic frequency 82 kHz as in the first embodiment, but the frequencies of up to the second modulation frequency $f_m = 21.5$ kHz may be handled, so that the frequency characteristics of the input buffer and the sample-and-hold circuit can be simplified.

As described above, the frequency characteristics to be attained may be of the lower frequency owing to the adoption of the present invention. Therefore the apparatus can be simplified, and the number of data items to be handled in the digital processing.

Figure 9:
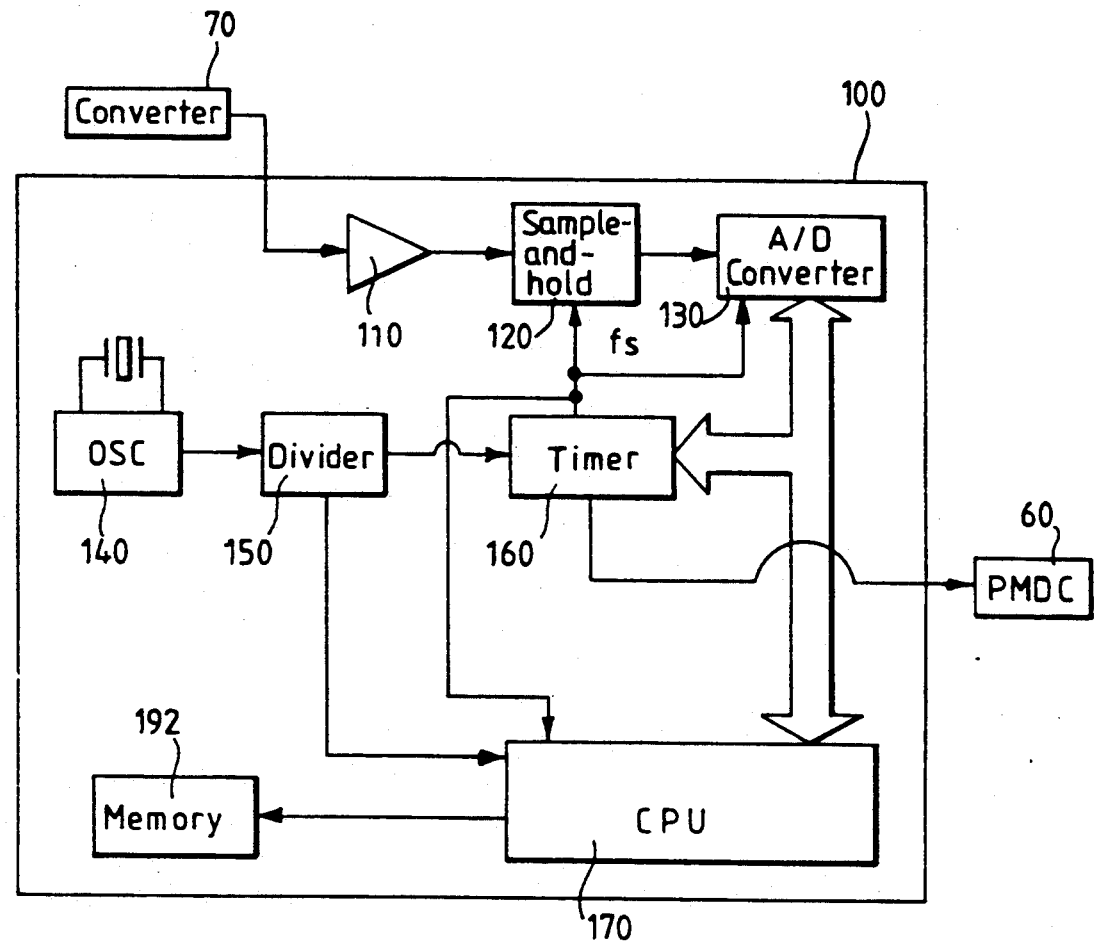
FIG. 9 shows a signal processing circuit being part of a fifth embodiment of the present invention.

FIG. 9 shows a fifth embodiment of the present invention. The signal processing circuit 100 of the fifth embodiment is substantially the same as that of the first embodiment, but the former differs from the latter in that it has a rewritable memory device 192 instead of the digital signal processor 180. As in the first embodiment, the interference signal is sampled and converted into the digital signal by the sample-and-hold circuit 120 and the A/D converter 130 in accordance with the sampling timings which the programmable timer 160 generates. The sampling timing signal from the progammable timer 160 is input to the microcomputer 170, and the sampled values of the interference signal are successively accumulated and stored in the rewritable memory device 192.

Figure 10:
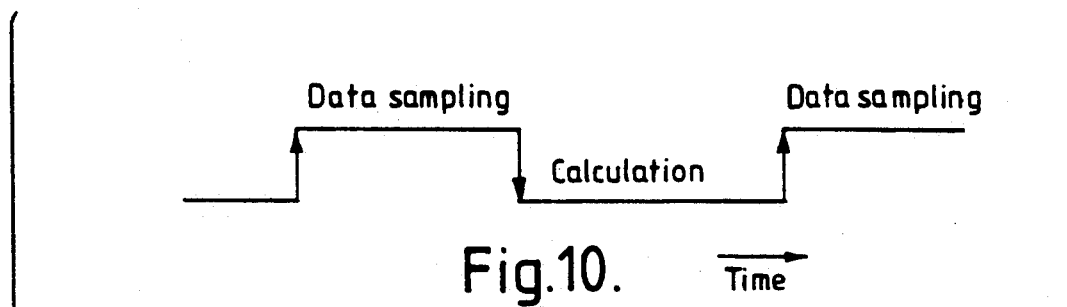
FIG. 10 shows an operating sequence which may be used in the present invention.
Figure 11:
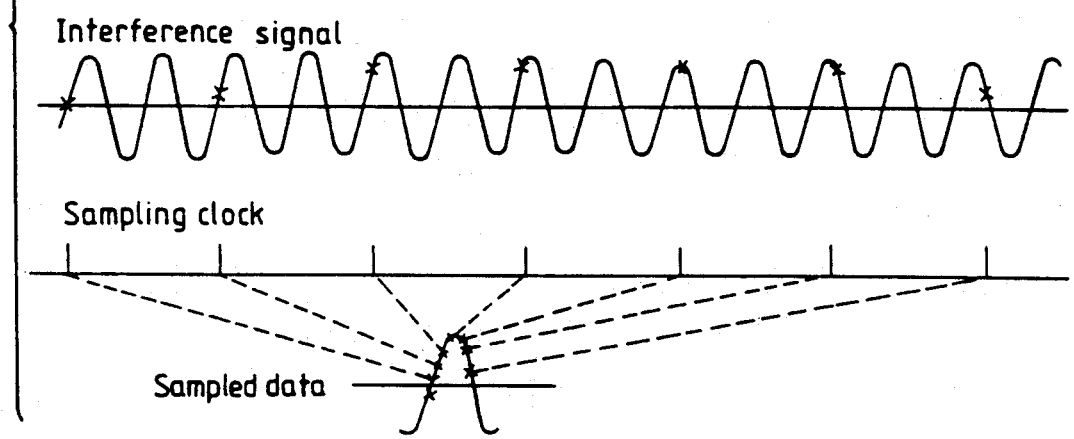
FIG. 11 shows a signal sampling operation which may be used in the present invention.

As illustrated in FIG. 10, the operation of the microcomputer 170 is divided into a data sampling period and a calculation processing period, which repeat alternately. The microcomputer 170 first accumulates a predetermined number of sampled values of the interference signal in the rewritable memory device 192 and subsequently reads out these differences of the interferometer. Then it calculates the angular velocity of rotation detected by the optical fiber gyro. As shown in FIG. 11 the microcomputer 170 reads out the interference signal data sampled in an equivalent time, from the rewritable memory device 192 and thereafter generates a signal waveform for one or more cycles of the time waveform of the interference signal, in the course of calculating the phase differences of the interferometer. The frequencies of the interference signal are analysed on the basis of the composed waveform and using a well-known high-speed Fourier transform method.

As described above, according to this embodiment, the data sampling and the calculation processing are separated in time, so that the signal processing of the interference sensor is possible without requiring a numerical calculation processing capability of very high speed.

In any of the first to fifth embodiments explained above, the phase difference of the interferometer is determined by analyzing the frequency spectrum of the interference signal. As stated below, however, the phase difference of the interferometer can be determined even by computing the waveform moment of the time waveform of the interference signal.

P' is defined as indicated in Eq. (17) for the interference signal P which is expressed by Eq. (1):

$$P' = P - a_0 \tag{17}$$

$$a_0 = (\tfrac{1}{2\pi}) \int_{-\pi}^{\pi} P\, d\theta \tag{18}$$

Here, $a_0$ denotes the D.C. component of the interference signal. For P', the waveform moment m of order m is computed as follows:

$$\mu_m = \int_{-\pi}^{\pi} \theta_m P\, d\theta \tag{19}$$

$$= \begin{cases} 4\pi K v a_{2n} \cos\phi_s & (m = 2n) \\ 4\pi K v \beta_{2n} \sin\phi_s & (m = 2n + 1) \end{cases} \tag{20}$$

$\phi_s$ denotes the phase difference of the interferometer, and $a_{2n}$ and $\beta_{2n}$ denote coefficients which are determined by the effective phase modulation index $\phi_e$. As is evident from Eq. (20), the m-th-order waveform moment of the interference signal is proportional to cos $\phi_s$ when m is an even number, and it is proportional to sin $\phi_s$ when m is an odd number. This is in a dual relationship with the fact that the even-numbered-order frequency spectrum of the interference signal is proportional to cos $\phi_s$, while the odd-numbered-order frequency spectrum thereof is proportional to sin $\phi_s$.

In each of the first to fifth embodiments, the phase difference $\phi_s$ of the interferometer can be determined by computing the waveform moment of the interference signal time waveform instead of calculating the frequency spectrum. The calculation of the frequency spectrum and that of the waveform moment may be combined so as to reduce the amount of calculation needed.

As described above, the adoption of the present invention enables the interference sensor to be of high precision and small size, so that the sensor may be applied in various uses.

Figure 12:
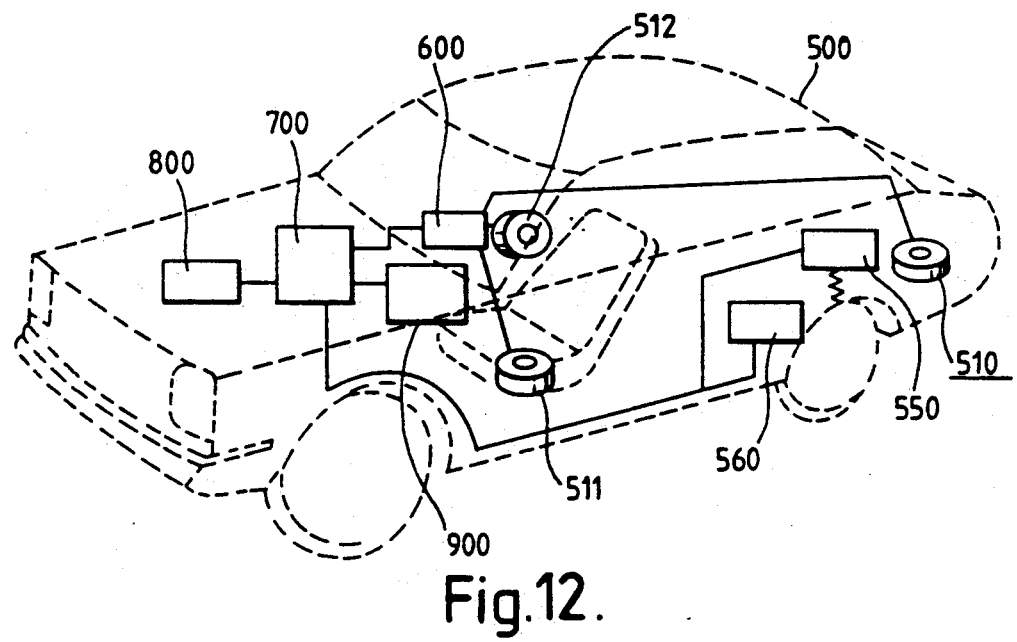
FIG. 12 is a diagram showing the application of the present invention to control a vehicle.

FIG. 12 shows an example of a control system when the present invention is applied to sensors for an automobile.

An interference sensor 511 for measuring the yawing of the car body, an interference sensor 512 for measuring the rolling of the car body, and an interference sensor 510 for measuring the pitching of the car body are respectively installed in an automobile 500. Although, as illustrated, individual sensors are located in different places, they may be collectively located in one place.

The outputs of the respective sensors are fed to a signal processor 600 and are converted into controlling signals, which are sent to an input/output controller 700. This input/output controller 700 is supplied with the detection results of the interference sensors for, e.g., a car, speed, temperature in the interior of the car etc. Although not shown, the output of the yawing sensor which indicates the rotational direction and rotational angle of the automobile is supplied from the input/output controller 700 to a navigation system. In the navigation system, the current position of the car is found using the above signal and the distance of travel evaluated by a separate speedometer or the like and is displayed by display means or the like and further the route leading to the destination, etc., may also be displayed.

In addition, the input/output controller 700 sends signals to an engine controller 800, an antiskid brake controller 900, an active suspension controller 550, a car height controller 560 and so forth.

When the automobile brakes, the antiskid brake controller 900 controls the braking forces of the right and left wheels so as to generate torques opposite in sign to the angular velocity or rotation of the car body based on the signal representing the angular velocity of rotation from the yawing sensor, and to decrease the absolute value of the signal representing the angular velocity of rotation, thereby to stop the automobile.

The active suspension controller 550 holds the car body stable while controlling the right and left and front and rear suspension elements so as to generate torques opposite in sign to the angular velocity of rotation from the pitching sensor 510 or the rolling sensor 512, and suppressing the absolute value of the signal representing the angular velocity of rotation so as to decrease that rotation.

In addition, the car receives a signal representing angular velocity from the rolling sensor 512 and holds the car body stable while controlling the suspension elements on the right and left of the car body so as to limit changes in the height of the car body.

It is also possible to employ the apparatus of the present invention in an arrangement in which the fiber loop 40 is mounted in a vertical plane so as to detect the rotation of the earth on its own axis, or in which the fiber loop 40 is turned round a vertical axis so as to find an absolute azimuth from a detected change in the angular velocity of the rotation of the earth on its own axis.

Figure 13:
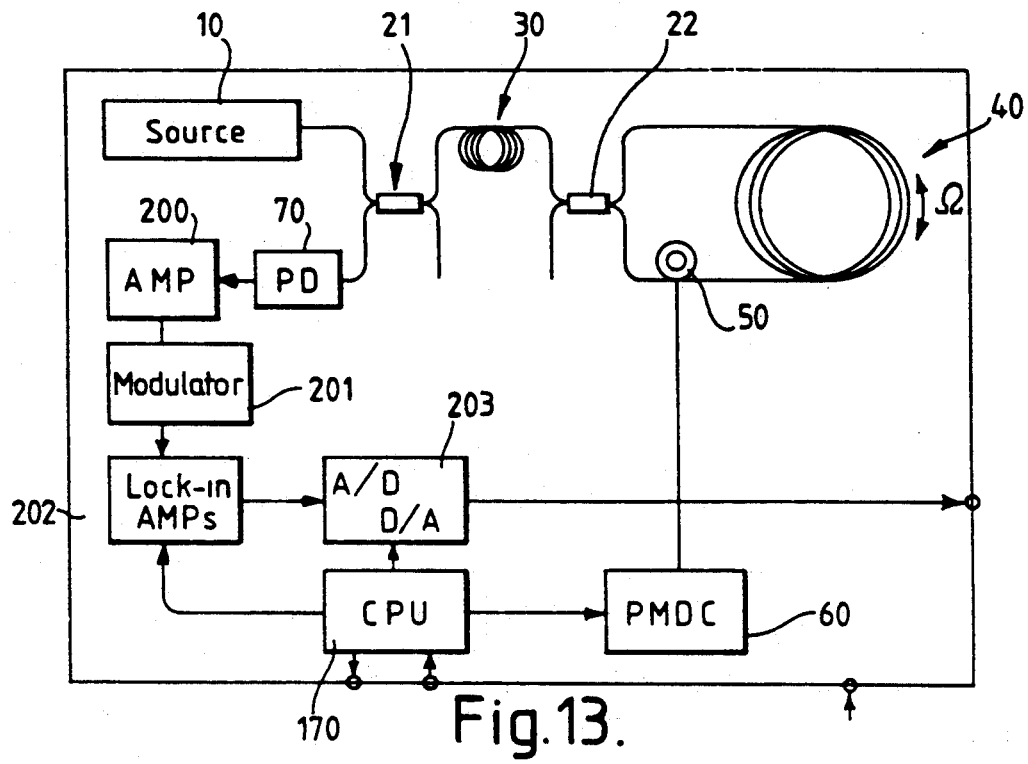
FIG. 13 is a schematic diagram of the general construction of an interference sensor, being a sixth embodiment of the present invention.

In the above description, an analysis was carried out on the basis of sampling the signal corresponding to the detection of the modulated and interfering beams. However, an equivalent effect can be achieved by applying an electronic modulation to the output of the detector which detects the modulated and interfering beams. A sixth embodiment of the present invention, shown in FIG. 13, illustrates such operation. In FIG. 13, components corresponding to components of the interference sensor shown in FIG. 1 are indicated by the same reference numerals.

In FIG. 13, the output of the converter (Phase Detector) 70 is amplified by an amplifier 200, and the resulting signal is modulated by a modulator 201. Thus, the signal from the modulator 201 has effectively had two modulations imposed on it, being the optical modulation imposed on the interfering beam by the optical phase modulator 50, and the second modulation imposed by the modulator 201. The modulation frequencies of these two modulations are different. The output of the modulator is passed via lock-in amplifiers 202 to an analog to digital and a digital to analog converter 203, which is controlled by the microcomputer 170. That microcomputer 170 also controls the lock-in amplifiers 202 and the phase modulator driver circuit 60.

The resultant processing is generally similar to the first to fifth embodiments, although sampling is then not necessary. However, it is possible to operate the interference sensor shown in FIG. 13 in combination with the sampling operations described earlier.

Figure 14:
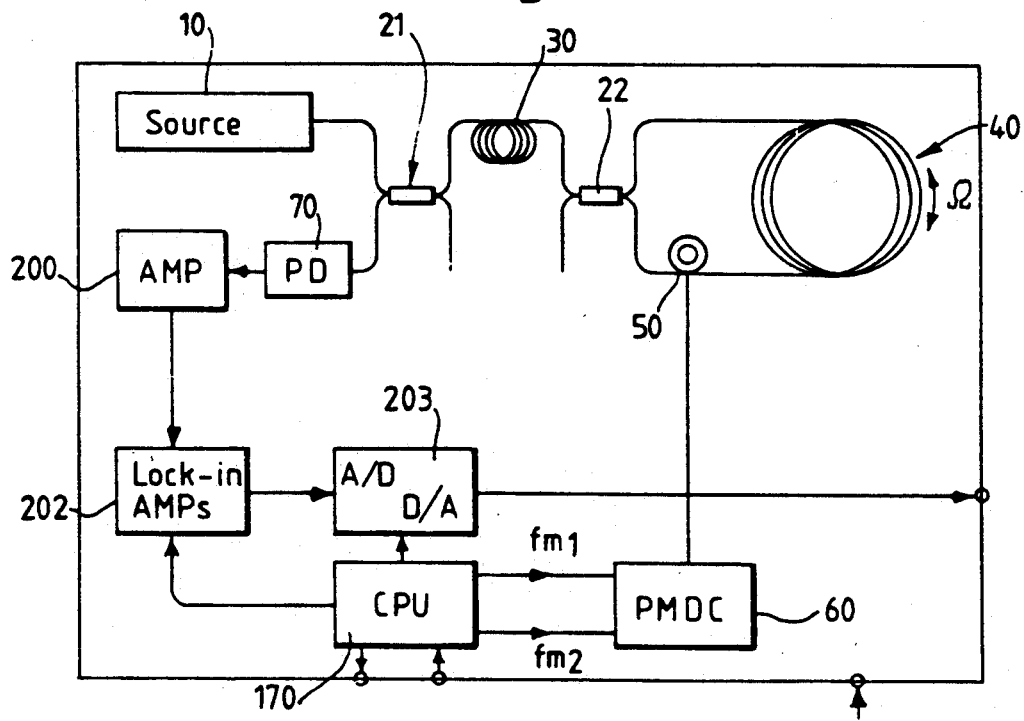
FIG. 14 is a schematic diagram of the general construction of an interference sensor, being a seventh embodiment of the present invention.

The seventh embodiment of the present invention is shown in FIG. 14. With the exception of the arrangement for modulating the signals, the arrangement is similar to the sixth embodiment of FIG. 13, and the same reference numerals are used for corresponding parts. In the embodiment of FIG. 14, however, the modulator 201 is omitted, and instead the microcomputer 170 supplies drive signals to the phase modulator drive circuit at two different frequencies $f_{m1}$ $f_{m2}$. These frequencies are different, so that the modulator 50 applies two different optical modulations to the interfering beams in the fiber loop 40. When the converter 70 detects the interference of those doubly-modulated beams, the signal is amplified via amplifier 200, the resulting input to the lock-in amplifiers 202 is exactly the same as the embodiment of FIG. 13. Therefore, a similar processing may be used, and indeed this can be combined with the sampling arrangement described with reference to the first to fifth embodiments.

All the embodiments described above have operated within the frequency domain for which consideration is given to the frequency of the electronic interference signal from the detector which detects the interfering radiation beams. However, it is also possible to analyse the phase-modulated signal in the time-domain, i.e. independent of frequency.

Figure 15:
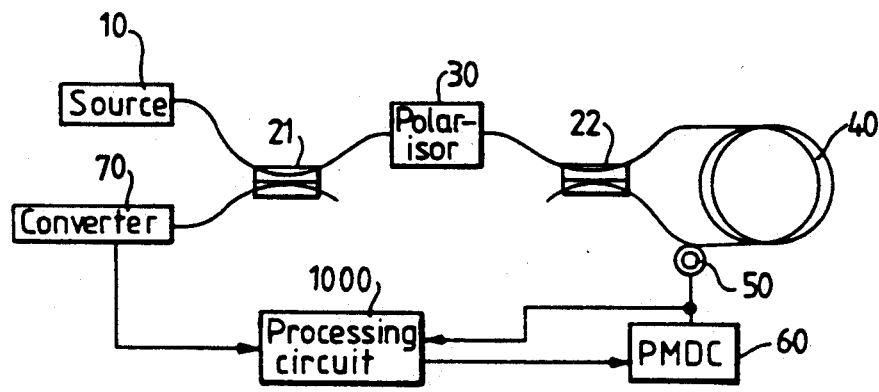
FIG. 15 is a schematic block diagram showing the general construction of an interference sensor, being an eighth embodiment of the present invention.

Embodiments of the present invention operating in the time domain will now be described with reference to FIGS. 15 to 24. FIG. 15 shows a general view of the interference sensor operating in the time domain, and it can immediately be seen that the general structure is similar to that of the first embodiment of FIG. 1, except that there is a difference in the processing circuit, which is therefore indicated at 1000. Other components, which correspond to the interfering sensor of FIG. 1, are indicated by the same reference numerals. Before describing the processing circuit 1000, however, it is necessary to re-consider the characteristics of the interference signal which is detected by the converter 70.

Assuming the characteristic of the phase modulator 50 to be ideal, the optical phase difference $\psi$ can be expressed by equation (21) and equations (4) and (5)

$$\psi = \phi s + \eta \cos\theta \quad \ldots (21)$$

where $\eta$ is an effective phase modulation index.

The eighth embodiment takes the maximum and minimum point of the interference signal waveform as waveform characteristic points.

At the maximum and minimum points, the differential of the interference signal P must satisfy the following equation (22) as a necessary condition.

$$dP/dt = -Kvwm\eta \sin\theta \sin\psi = 0 \quad \ldots (22)$$

assuming $d\phi s/dt = 0$ and $d/dt = 0$.

Therefore, at time t when $\sin\theta = 0$ or $\sin\psi = 0$, the interference signal will take an extremum.

The first embodiment uses the following equations (23) to (25) as design conditions of the optical fiber gyro.

Effective phase modulation index:

$$\pi/2 \leq \eta < \pi \quad \ldots (23)$$

Phase difference to be measured:

$$|\phi s| < \pi/2 \quad \ldots (24)$$

Optical phase difference:

$$|\psi| < \pi \quad \ldots (25)$$

Figure 16:
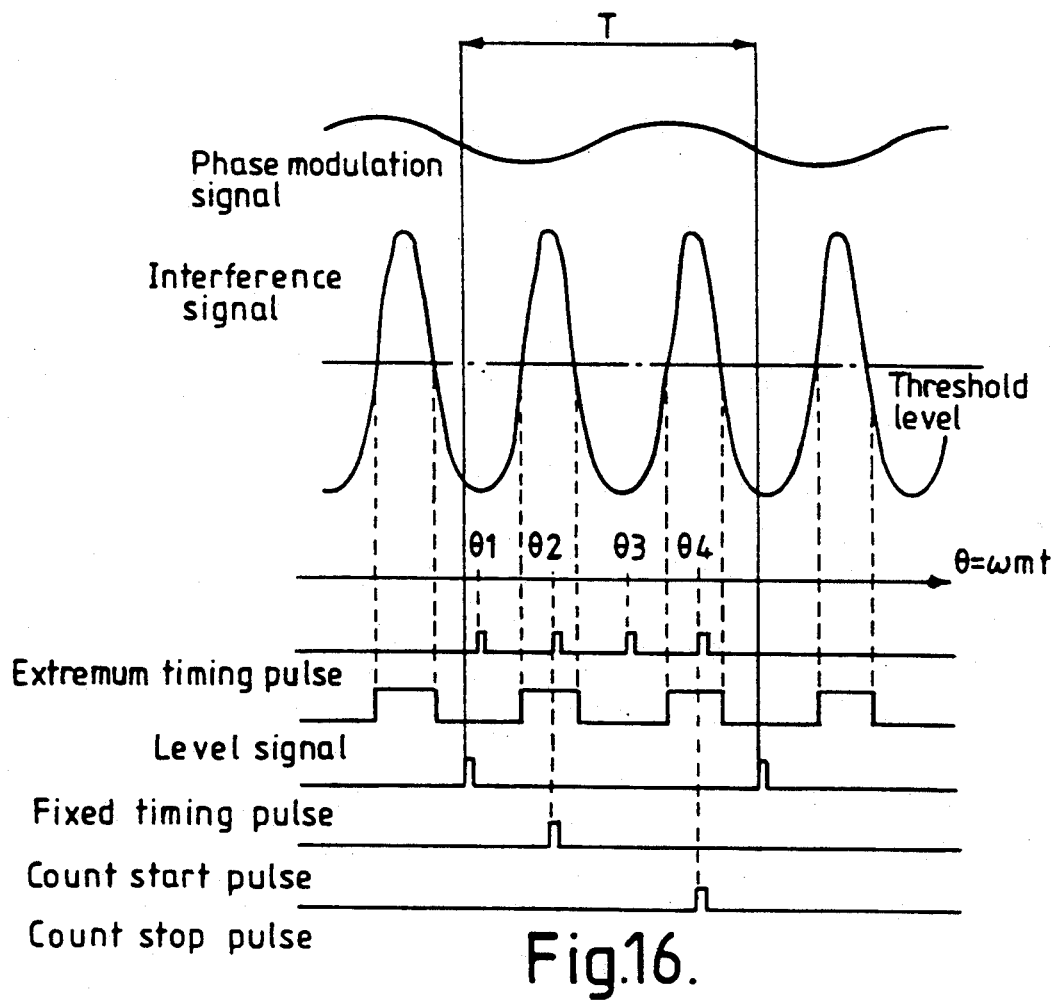
FIG. 16 is a waveform diagram showing the timing of signals in the eighth embodiment.

Under these conditions, the interference signal waveform will be as shown in FIG. 16, with four maximum and minimum points appearing in one cycle of the phase modulation signal.

Suppose the solutions for $\sin\theta = 0$ are $\theta 1$ and $\theta 3$ and those for $\sin\psi = 0$ are $\theta 2$ and $\theta 4$. Then with $\theta 1 = 0$ taken as a reference, $\theta 3 = \pi$. From equations (21) and (24) it follows that: $\phi s = -\eta \cos\theta 2 = -\eta \cos\theta 4 \quad \ldots (26)$.

Hence, the time positions of $\theta 2$, $\theta 4$ will change with the optical phase difference being measured $\phi s$ (in this embodiment, proportional to the rotational angular velocity) according to equation (25).

The minimum points $\theta 1$, $\theta 3$ are fixed points independent of $\phi s$. $\eta$ is a constant determined by the phase modulator characteristic and the phase modulator drive signal.

When the phase difference of $\theta 2$ (or $\theta 4$) with respect to $\theta 1$ (or $\theta 3$) is measured, the phase difference to be measured $\phi s$ can be determined from equation (26).

Since, from equation (21), the phase distance between $\theta 2$ and $\theta 3$ ($=\pi$) and that between $\theta 4$ and $\theta 3$ ($=\pi$) are equal, it is also possible to determine the phase difference $\phi s$ by measuring the phase difference between $\theta 2$ and $\theta 4$ and solving the equation (26).

Measuring the phase difference between the maximum and minimum points is equivalent to measuring the time intervals between each point, as is seen from equation (4). So, this embodiment measures the time difference.

As a time reference for measuring the time intervals, a highly accurate and stable clock can be obtained relatively easily with a quartz oscillator. The use of a high-speed clock will increase the resolution and therefore the magnitude of the effective digits of measurement, expanding the dynamic range.

As is obvious from equation (26), when $\phi s = 0$, which represents a zero rotational angular velocity, $\cos\theta 2 = \cos\theta 4 = 0$, that is, $\theta 2 = \theta 4 = 90° \pm 180°$.

In other words, when $\phi s = 0$, $\phi s$ can be expressed as $\phi s = \pm \eta \cos(90° + \Delta\theta) = \pm \eta \sin(\Delta\theta)$. A change in phase that corresponds to a change in the value of the sine function $\pm \eta \sin(\Delta\theta)$ becomes maximum at a point close to $\phi s = \pm \eta \sin(\Delta\theta) = 0$.

Equation (5) indicates that the change in time position is proportional to the phase change.

Thus, the measurement of φs based on the measurement of time position at points θ2 and θ4 according to this embodiment can have a maximum measuring sensitivity at a point close to φs=0.

In this way, this invention is intended to improve the ease and performance of interference measurement by making use of high precision clocking.

Now, the signal processing circuit 1000 of the eighth embodiment will be explained.

Figure 17:
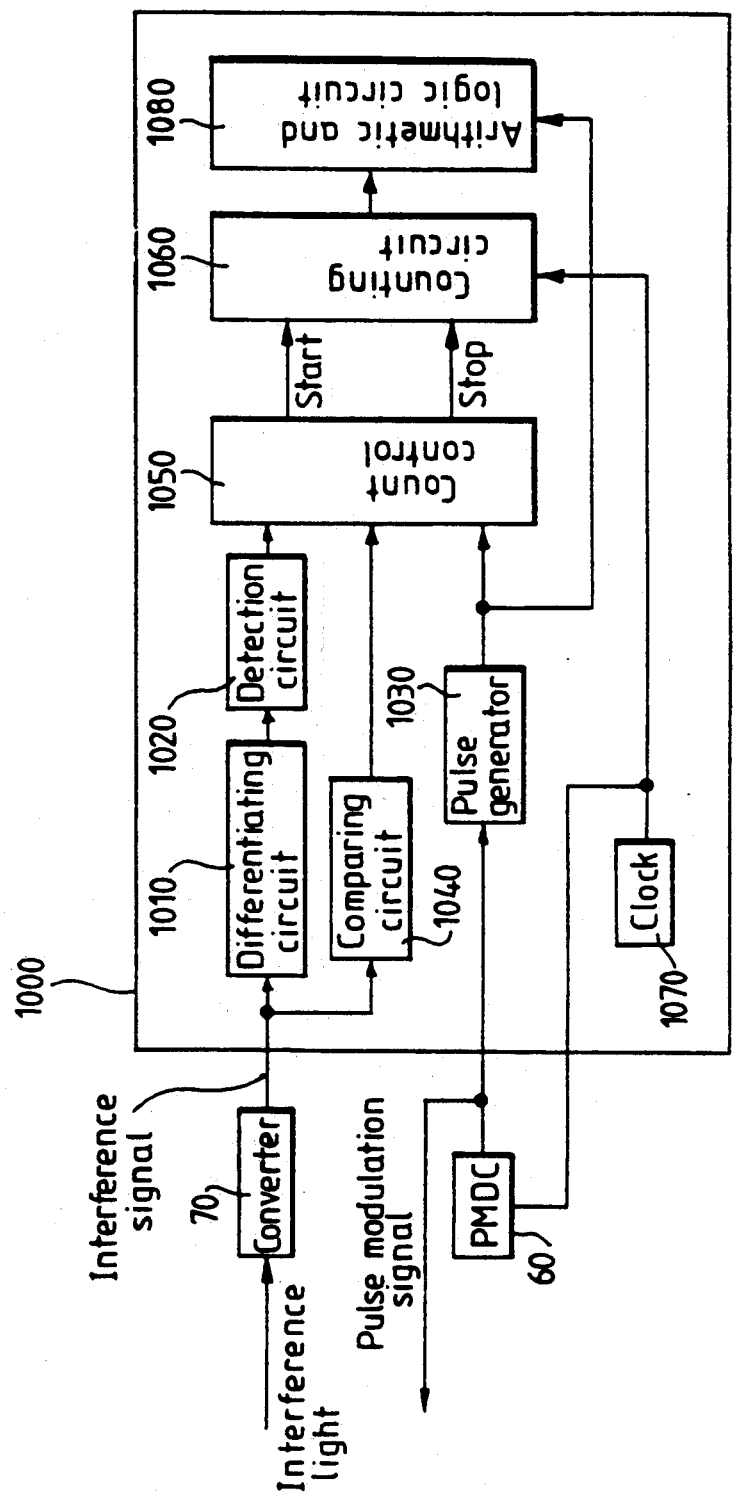
FIG. 17 illustrates the structure of the signal processing circuit used in the eighth embodiment of the present invention.

FIG. 17 shows a block diagram of the signal processing circuit 1000 of the eighth embodiment.

In FIG. 17 there is shown a photoelectric conversion circuit 70 to convert the interference light into an electric signal and output an interference signal. The interference signal from the photoelectric conversion circuit 70 is applied to a differentiating circuit 1010 where it is differentiated. A zero-crossing detection circuit 1020 detects the zero-crossing point of the differential signal and generates an extremum timing pulse train representing the times at which the interference signal becomes the maximum or minimum.

A level comparing circuit 1040 compares the level of the interference signal with a specified threshold level and outputs a rectangular level signal in dependence on the result of the comparison.

A fixed phase pulse generating circuit 1030 generates a specified phase timing by taking as a reference input a modulating signal from the phase modulator drive circuit (PMDC) 60.

A count control circuit 1050 generates a count start pulse and a count stop pulse for controlling the operation of a counting circuit 1060 in dependence on the extremum timing pulse from the zero-crossing detection circuit 1020, the fixed timing pulse from the fixed phase pulse generating circuit 1030, and the level signal from the comparison circuit 1040.

In response to the count start and stop pulses, the counting circuit 1060 counts the clock pulses output from the clock circuit 1070. An arithmetic and logic unit 1080 reads the count value from the counting circuit 1060, calculates the phase difference φs to be measured by using equation (26), and converts that phase difference into a measurement of the angular velocity of rotation.

A suitable device for detecting the times at which the maximum and minimum of the interference signal occur may be, for example, a peak detection circuit.

The time waveform of the interference signal may use other characteristic points such as a waveform center, which is determined from the n-th order moment of the time waveform.

The operation of the eighth embodiment will now be described.

The zero-crossing detection circuit 1020 of this embodiment generates four extremum timing pulses in one cycle of the phase modulation signal.

To calculate φs by using equation (26), each of the four pulses must correspond to θ1 to θ4. For this purpose, this eighth embodiment provides a fixed phase pulse generating circuit 1030, which generates a specified phase timing according to the modulation signal supplied as a reference input from the phase modulator drive circuit 60, and a level comparison circuit 1040 that compares the interference signal level with the specified threshold level and outputs a rectangular level signal according to the result of comparison.

The count control circuit 1050 generates pulses to start and stop counting, to control the operation of the counting circuit 1060, in dependence on the extremum timing pulse from the zero-crossing detection circuit 1020, the fixed timing pulse from the fixed phase pulse generating cuircuit 1030, and the level signal from the level comparison circuit 1040. In this embodiment, as shown in FIG. 16, the count start pulse and the count stop pulse are issued at the maximum point θ2 and the maximum point θ4, respectively. Therefore the time interval between the points θ2 and θ4 can be measured. The counting circuit 1060 counts the clock pulses supplied from the clock circuit 1070 according to the count start and stop pulses from the count control circuit 1050. The arithmetic and logic unit 1080 reads the count value from the counting circuit 1060 to calculate the phase difference φs to be measured by using equation (26) and then transforms the calculated phase difference into a rotating angular velocity. The fixed timing pulse gives the start timing for this series of operations.

The phase modulator drive circuit 60 generates a phase modulation signal according to the clock pulses from the count clock generating circuit 1070. Hence, the phase modulator drive circuit 60 and the signal processing circuit 1000 operate in synchronism with each other.

A ninth embodiment of this invention will now be described.

When a piezo-ceramic element is used as the phase modulator, the modulation characteristic may exhibit a significant temperature dependency. This in turn causes the effective phase modulation index to drift with temperature, causing the output of the gyro to display a characteristic.

To eliminate this unwanted temperature dependency, means for compensating for variations in the modulation index is provided in the signal processing circuit 1000 of the ninth embodiment.

In the ninth embodiment, the design conditions for the optical fiber gyro are given by the following equations (27) to (29).

Effective phase modulation index:

$$\pi \leq \eta < 2\pi \qquad \ldots (27)$$

Phase difference to be determined:

$$|\phi s| < \pi \qquad \ldots (28)$$

Optical phase difference:

$$|\psi| < 2\pi \qquad \ldots (29)$$

Figure 18:
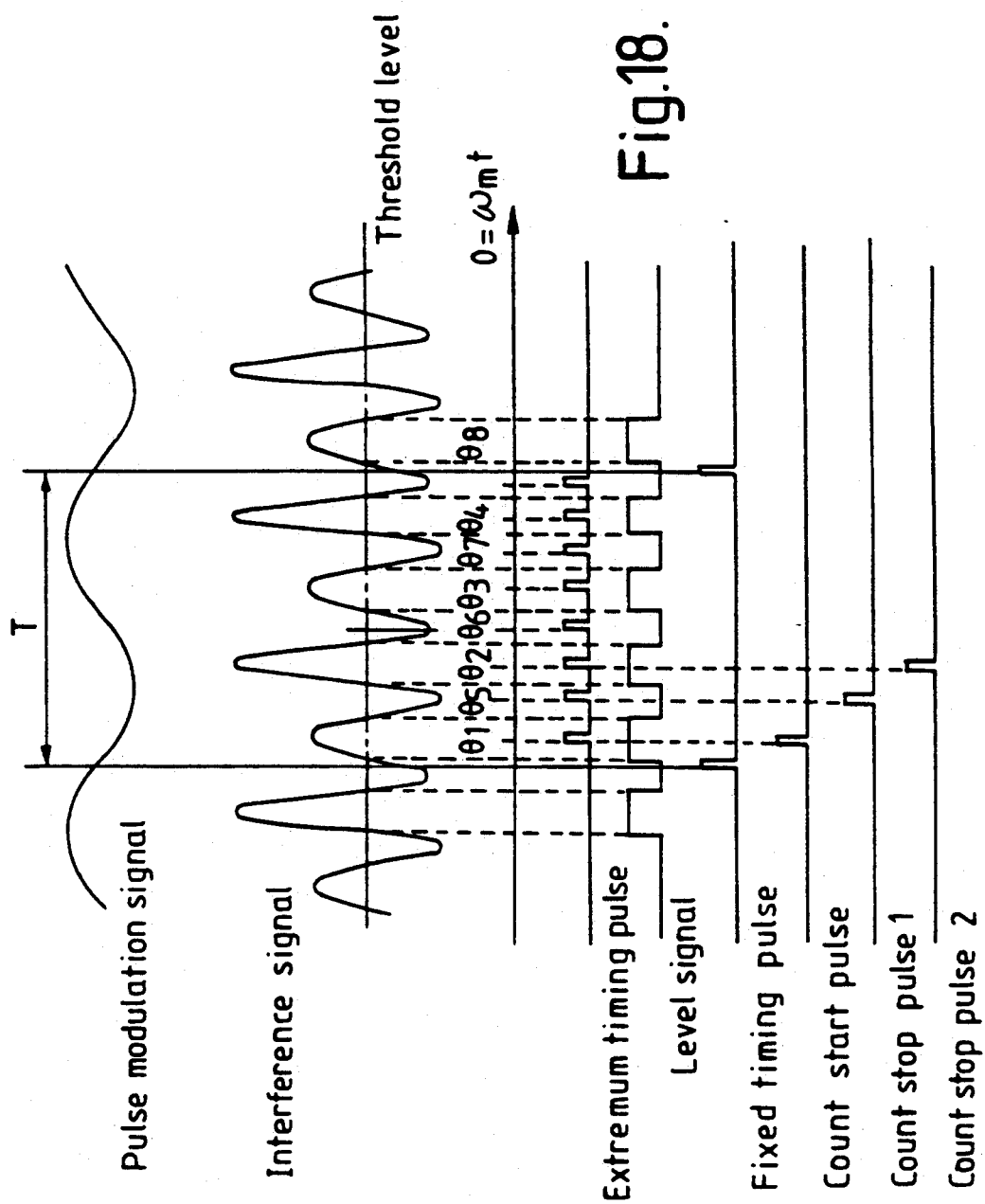
FIG. 18 is a waveform diagram showing the timing of signals in a ninth embodiment of the present invention.
Figure 19:
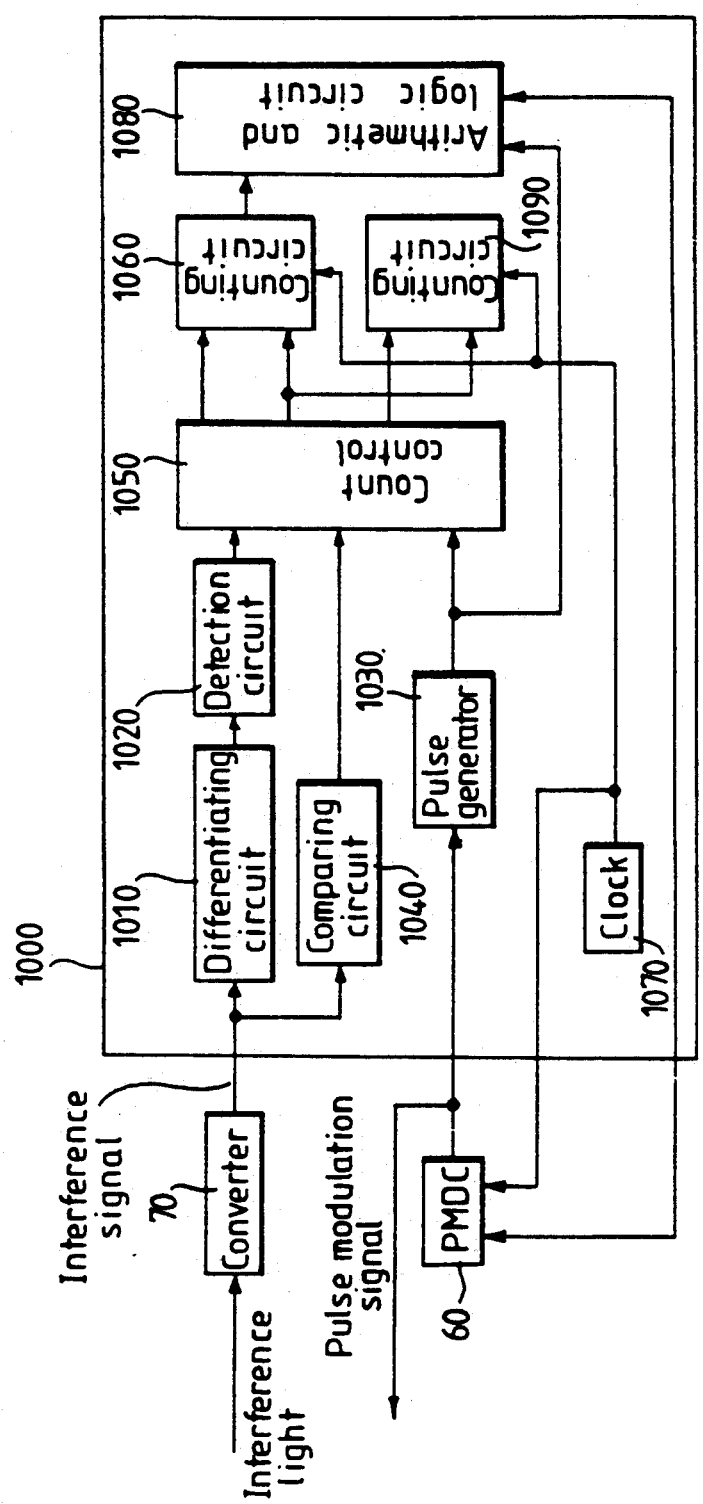
FIG. 19 is a block diagram of a signal processing circuit, being part of the ninth embodiment of the present invention.

In this case, the time waveform of the interference signal has eight maximum and minimum points during one cycle of the phase modulation signal starting from the zero point of the differential signal, as shown in FIG. 18.

As shown in FIG. 18, these maximum and minimum values are designated θ1 to θ8. θ1 to θ4 are solutions that satisfy sinθ=0 and sinψ=0, as in the case of the eighth embodiment. Thus, θ1=0 and θ3=π are fixed points independent of the phase difference to be determined φs (in this embodiment, proportional to the rotating angular velocity). θ5=π to θ8 are solutions that satisfy sinψ=0, a condition that is added when the design conditions of the optical fiber gyro are converted into equations (27) to (29). θ2 and θ4, and θ5 to θ8 are all dependent on the phase difference φs. Therefore, φs can be determined by measuring the phase difference or angular velocty of rotation so as to decrease that rotation.

The count control circuit 1050 generates a count start pulse at the phase timing $\theta 1$ and a first and second count stop pulse at the phase timing $\theta 2$ and $\theta 3$ respectively.

The counting circuit 1060 and the counting circuit 1090 measure the time interval $\Delta 1$ between $\theta 5$ and $\theta 1$ and a time interval $\Delta 2$ between $\theta 2$ and $\theta 1$, according to the instruction of the count start pulse and the first and second count stop pulses. At this time, the following equations (30) and (31) hold.

$$\phi s + \eta \cos w_m \Delta 1 = \pi \qquad \ldots (30)$$

$$\phi s + \eta \cos w_m \Delta 2 = 0 \qquad \ldots (31)$$

The arithmetic and logic circuit 1080 solves the equations (30) and (31) as simultaneous equations for $\phi s$ and $\eta$. When the effective phase modulation index $\eta$ thus obtained differs from a specified value (equation (5), the arithmetic and logic circuit 1080 adjusts the control signal to the phase modulator drive circuit 60 to keep at a specified value. The process of deriving the rotational angular velocity from the phase difference $\phi s$ is the same as that carried out in the eighth embodiment.

As with the eighth embodiment, the fixed timing pulse gives the start timing for the above sequence of operations.

Rather than adjusting the control signal to the phase modulator drive circuit 60 to keep $\eta$ at a specified value, the arithmetic and logic circuit 1080 may compensate for the quantity corresponding to the deviation in the value $\eta$.

Figure 20:
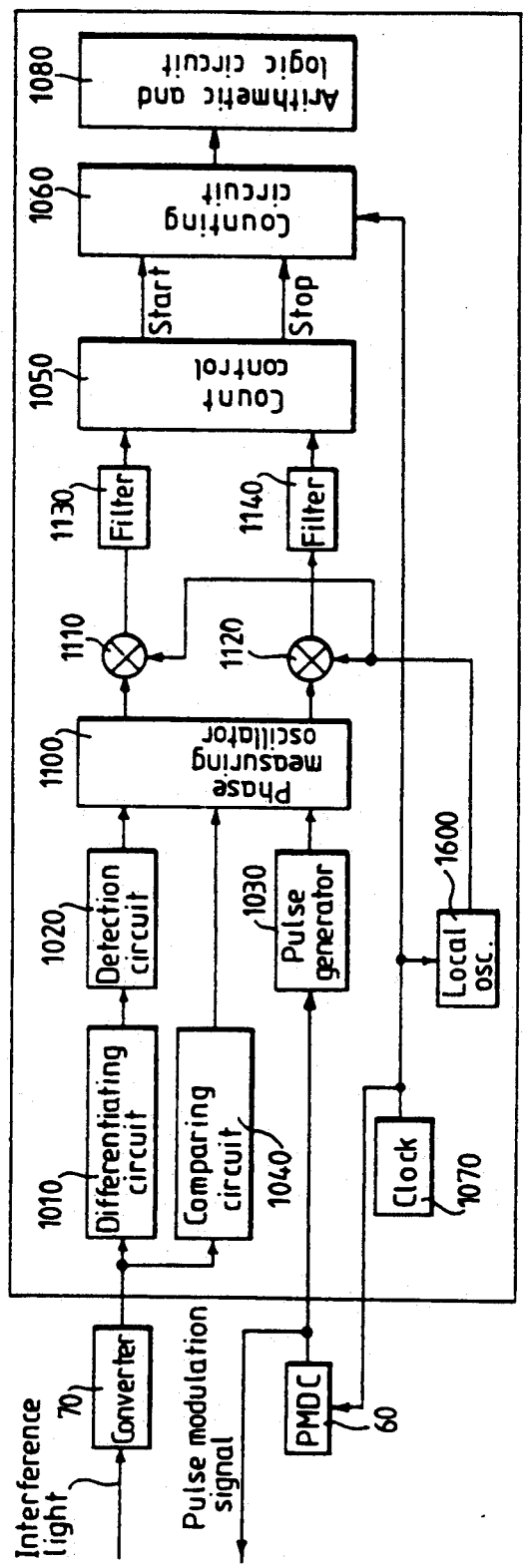
FIG. 20 is a block diagram of a signal processing circuit, being part of a tenth embodiment of the present invention.

Next, we will describe a tenth embodiment. FIG. 20 shows the configuration of the signal processing apparatus 1000 of the tenth embodiment.

The conditions under which the optical fiber gyro of this embodiment is designed are similar to those of the eighth embodiment, except that a local oscillator 1600 is provided to introduce a frequency converting means to improve the accuracy of measuring the extremum timing phase difference.

In FIG. 20, the local oscillator 1600 generates a locally oscillated signal, which is a sinusoidal wave of angular frequency $w_z$, which is defined as follows.

$$w_z = w_m - \Delta w \qquad \ldots (32)$$

The local oscillation frequency $w_z$ differs from the phase modulation angular frequency $w_m$ by an angular frequency $\Delta w$. This oscillator operates according to the clock signals generated by the count clock generating circuit 1070.

Figure 21:
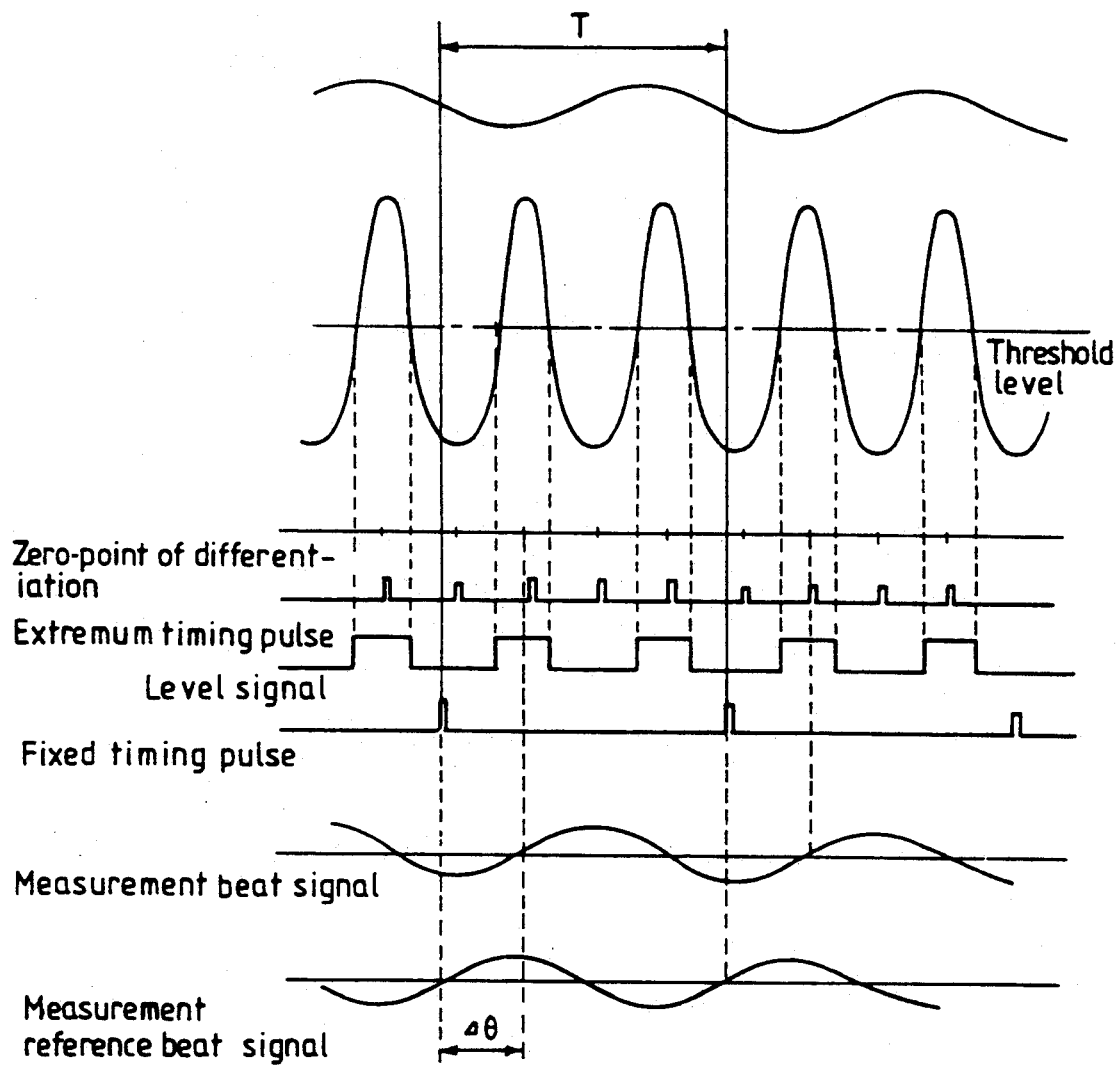
FIGS. 21 and 22 are waveform diagrams showing the timing of signals in the tenth embodiment of the present invention.

Again the photoelectric conversion circuit 70 transforms the interference light into an electric signal and thereby generates an interference signal. The interference signal outputted from the photoelectric conversion circuit 70 enters the differentiating circuit 1010, where it is differentiated. The zero-crossing point of the differential signal is detected by the zero-crossing detection circuit 1020. A phase measuring oscillator 1100 receives the extremum timing level from the zero-crossing detection circuit 1020 and the level signal from the level comparison circuit 1040 and generates a measurement-object signal, which is a sinusoidal wave whose zero-crossing point is at the phase of the maximum point. It also receives the fixed timing pulse from the fixed phase pulse generating circuit 1030 and generates a measurement reference signal, being a sinusoidal wave whose zero-crossing point is the phase. The timing chart of these signals is shown in FIG. 21. The angular frequencies of the measuring signal and measurement reference signal are equal to the phase modulation angular frequency $w_m$.

The measuring signal outputted from the phase measuring oscillator 1100 is supplied to a mixer circuit 1110 where it is multiplied by the locally oscillated signal. Then, the output of the mixer circuit 1110 is fed to a low-pass filter 1130 which extracts only a measurement-object beat signal whose angular frequency is equal to the difference frequency $\Delta w$ between the phase modulation angular frequency $w_m$ and the locally oscillated frequency $w_z$.

In other words, the frequency is changed by extracting, from a signal containing frequency components representing both the sum and difference of angular frequencies of two signals obtained as a result of multiplication, only the frequency component that represents the angular frequency difference.

To obtain the measurement reference signal, the same operation is performed, i.e., the measurement reference signal is fed to a mixer circuit 1120 and a low-pass filter 1140 and converted into a measurement reference beat signal whose angular frequency is equal to $\Delta w$.

The count control circuit 1050 detects the zero-crossing points of the measurement reference beat signal and the measurement beat signal, and generates the count start and stop pulses at the corresponding zero-crossing timing. The counting circuit 1060, in response to the instruction of the count start and stop pulses, counts the count clock pulses from the count clock generating circuit 1070. The arithmetic and logic circuit 1080 reads the count value from the counting circuit 1060 to calculate the target phase difference $\phi s$ and then converts it into a measurement of the angular velocity of rotation.

The phase modulator drive circuit 60 generates a phase modulation signal according to the count clocks from the count clock generating circuit 1070.

Now, the operation of the tenth embodiment will be described below.

Since the phase of the measurement reference signal is fixed and known, calculating the angular velocity output of the optical fiber gyro by using the equation (26) can be done by only measuring the phase difference $\Delta \theta$ of the measurement signal with respect to the measurement reference signal, as mentioned in the eighth embodiment. Since there are two maximum points in one cycle of the phase modulation signal, as in the eighth embodiment, an alternative is to generate first and second measurement-object signals at these maximum point timings. In this case, the first and second maximums can easily be distinguished from each other by taking the fixed timing pulse as a reference. The phase difference of the light beams can be obtained from the phase difference between the first and second measurement-object signals.

Thus, in the tenth embodiment the measurement signal and the measurement reference signal are mixed with the locally oscillated signal to produce a low-frequency beat signal.

The measuring signal outputted from the phase measuring oscillator 1100 is fed to the mixer circuit 1110 to be multiplied by the locally oscillated signal. The output of the mixer circuit 1110 is passed through the low-pass filter 1130 to be converted into a measurement-object beat signal whose angular frequency is equal to the difference frequency Δw between the phase modulation angular frequency $w_m$ and the locally oscillated frequency $w_z$.

The same operation is carried out also on the measurement reference signal. The measurement reference signal is sent to the mixer circuit 1120 and the low-pass filter 1140, and is transformed into a measurement reference beat signal of an angular frequency of Δw.

The period T' of these beat signals is expressed by equation (33).

$$T' = 2\pi/\Delta w \quad \ldots (33)$$

In the above frequency conversion process, if the low-pass filters 1130, 1140 have the same phase characteristics, the phase difference between the measurement object signal and the measurement reference signal is retained as the phase difference between the measurement beat signal and the measurement reference beat signal.

Figure 22:
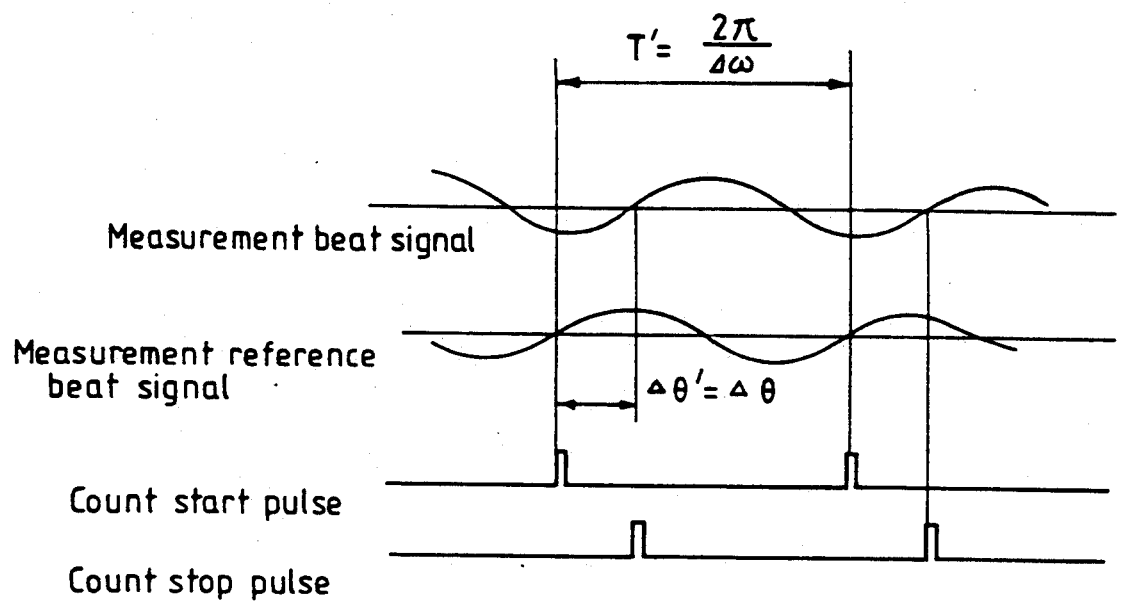

In other words, as shown in FIG. 22, the phase relationship between the measurement-object beat signal and the measurement reference beat signal is identical to that between the measurement-object signal and the measurement reference signal before frequency conversion. Because the frequency has shifted to the beat signal frequency Δw in the low frequency region, the measuring of the phase difference becomes relatively easy.

If the phase characteristics of the low-pass filters are not strictly identical, the offset phase difference that depends on the phase characteristic of the filter circuits may be examined beforehand and compensated for accordingly.

The detection of the phase difference between the measurement-object beat signal and the measurement reference beat signal can be realized as in the first embodiment.

That is, in FIG. 20 the count control circuit 1050 detects the zero-crossing points of the measurement reference beat signal and the measurement-object beat signal and generates count start and stop pulses at these zero-crossing timings.

In response to the pulses from the count control circuit 1050, the counting circuit 1060 counts the clock pulses, the count value of which is supplied to the arithmetic and logic circuit 1080 which calculates the angular velocity according to equation (26), as in the first embodiment. The timing relationships between these signals is shown in FIG. 22.

As explained above, the tenth embodiment shifts the phase difference measurement to the low frequency range by the frequency conversion, permitting measurement of phase difference or time interval with a higher resolution compared with that of the eighth embodiment when the same clock frequency is used.

In the tenth embodiment the locally oscillated signal, the measurement-object signal, and the measurement reference signal employ sinusoidal waves. However, the reference signals may be rectangular wave signals or other cyclically recurring signals. When rectangular waves are used, the mixer circuits 1110, 1120 may be formed by logic circuits using Exclusive-OR gates.

The frequency conversion employed in the tenth embodiment may be achieved by other means.

Next, an eleventh embodiment will be described. The eleventh embodiment mixes the interference signal and the phase modulation signal with the locally oscillated signal and modulates them into low-frequency signals.

Figure 23:
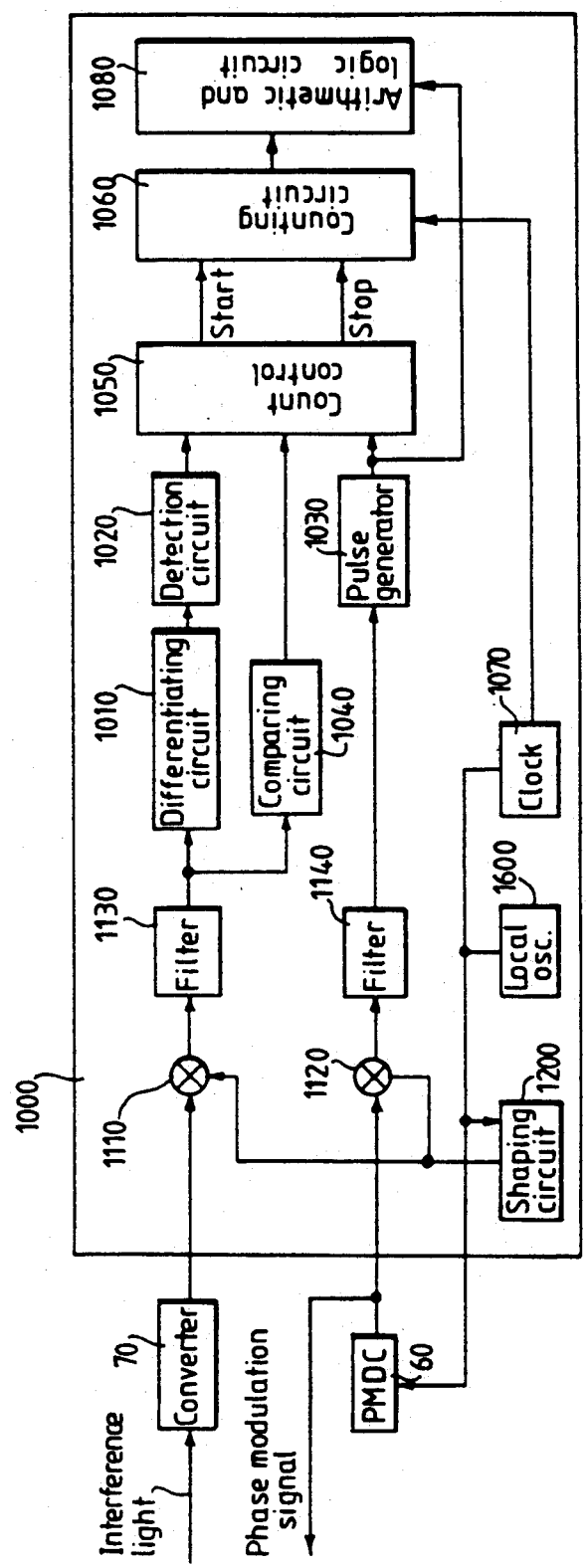
FIG. 23 is a block diagram showing a signal processing circuit, being part of an eleventh embodiment of the present invention.

FIG. 23 shows the configuration of the signal processing circuit 1000 of the eleventh embodiment.

The mixer circuit 1110 and the low-pass filter 1130 perform frequency conversion of the interference signal, while the mixer circuit 1120 and the low-pass filter 1140 perform frequency conversion of the phase modulator drive signal. A waveform shaping circuit 1200 modifies the shape of the locally oscillated signal generated by the local oscillator 1600. Other components are identical to those of the eighth embodiment, and corresponding reference numerals are used.

The operation of the eleventh embodiment will be now explained.

The design conditions of the optical fiber gyro of this embodiment are the same as those of the eighth embodiment, and the timings of signals are similar, except that the signals are processed in a low frequency range after the frequency conversion.

This reduces the weight in terms of phase or time interval measurement of each count clock pulse generated by the count clock generating circuit 1070, improving the resolution of measurement through counting a large number of pulses.

In order to retain the time waveform of the interference signal in the low frequency range, the locally oscillated signal must be such that a phase modulation angular frequency and its harmonic component contained in the locally oscillated signal have equal amplitude intensities. For this purpose, the eleventh embodiment includes a shaping circuit 1200 that modifies the shape of the locally oscillated signal generated by the local oscillator 1600.

While in the eleventh embodiment the time waveform of the signal is retained after the frequency conversion, the frequency conversion for retaining the time waveform need not be performed. Instead, other frequency conversion may be employed that will retain the correspondence between the signals before and after frequency conversion. In this case, the time intervals between points on the frequency-converted signal that correspond to the waveform characteristic points of the signal before being subjected to the frequency conversion may be measured to determine the phase difference between the interfering signals.

Next, a twelfth embodiment will be described.

The twelfth embodiment achieves frequency conversion by modulating the intensity of a light source 70 with a locally oscillated signal. This permits one mixer circuit in the eleventh embodiment to be eliminated. To retain the interference signal waveform in the low frequency region, each of the frequency spectra of the local oscillated signal is made to have equal amplitudes, as in the eleventh embodiment.

Figure 24:
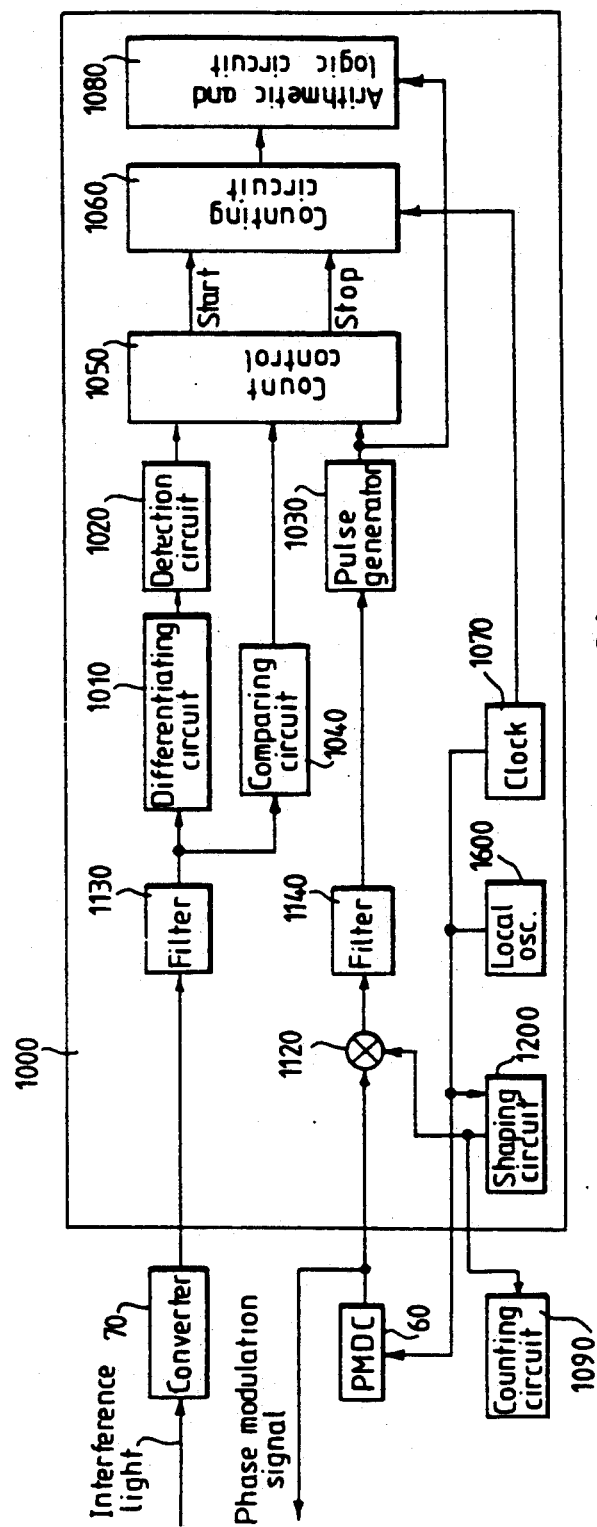
FIG. 24 is a block diagram of a signal processing circuit, being part of a twelfth embodiment of the present invention.

FIG. 24 shows the configuration of the signal processing apparatus of the twelfth embodiment.

The construction of the signal processing apparatus of the twelfth embodiment is similar to that of the eleventh embodiment except that the mixer circuit for mixing the interference signal and the locally oscillated signal is omitted. Thus, detailed explanation of the configuration of the circuit 1000 is not necessary.

Embodiments of the invention when applied to an optical fiber gyro have been discussed. However, this invention makes use of general properties of waves and thus can be applied not only to an optical fiber gyro but also to any apparatus or technique whereby physical quantities are measured by the interference of waves, such as phase-modulated electromagnetic waves (including light), sound waves or electron beams.

In the above eighth to twelfth embodiments, consideration is given to the time waveform of the interference signal and the optical phase difference of interfering waves is determined by measuring the phases of the characteristic points of the time waveform, i.e., time position or time interval of the characteristic points. Therefore, because analysis is in the time domain, not the frequency domain, no high-precision operational amplifier or analog digital converter is required, making the electronic circuit simple. This invention also permits compensation of drift of a modulating means such as a phase modulator. Further, unlike systems that measure signal voltage amplitudes by a linear circuit with high accuracy, this invention can expand the dynamic range of interference measurement by using a high-speed clock or a frequency conversion means.

Also, as described above, an interference sensor according to the present invention permits lower frequencies to be processed owing to e.g., the use of "down sampling" and makes it possible to execute digital processing which has not been achievable with known interference sensors handling higher frequencies. This has the advantage that the interference sensor can be made small in size but provide good accuracy and that the interference sensor of the present invention may be applied to a rotational measuring sensor, etc., for an automobile, etc.

What is claimed is:

1. An interference sensor for measuring a physical quantity affecting an optical phase difference between first and second optical beams, comprising:
    a source for generating optical radiation;
    means for generating first and second optical beams from the generated optical radiation;
    means for affecting at least one of the first and second optical beams with a physical quantity, thereby affecting an optical phase difference between the first and second optical beams;
    an optical phase modulator for optically modulating the first and second optical beams at a first modulation frequency $f_m$;
    means for causing the modulated first and second optical beams to interfere with each other, thereby generating an optical interference beam;
    means for generating an electronic interference signal from the optical interference beam; and
    an analyzer for analyzing the electronic interference signal to derive the optical phase difference between the first and second optical beams, thereby measuring the physical quantity;
    wherein the analyzer includes means for sampling the electronic interference signal at a sampling frequency $f_s$ to obtain a series of sampled data, means for extracting aliasing frequency components $\Delta f$ from the series of sampled data in accordance with a relationship $\Delta f = f_m - n f_s$, where n is an integer, and means for deriving the optical phase difference from a parameter of the extracted aliasing frequency components.

2. An interference sensor according to claim 1, wherein the means for sampling affects sampling at the sampling frequency less than the first modulation frequency and the means for extracting aliasing frequency components extracts aliasing frequency components so that harmonics thereof always have a frequency less than the first modulation frequency.

3. An interference sensor according to claim 1, wherein the means for deriving the optical phase difference includes means for demodulating the extracted aliasing frequency components with a frequency signal obtained by sampling the first modulating frequency at the sampling frequency.

4. An interference sensor according to claim 1, wherein the parameter is an amplitude of the extracted aliasing frequency components.

5. An interference sensor according to claim 1, wherein the parameter is a phase of the extracted aliasing frequency components.

6. An interference sensor according to claim 1, wherein the sampling frequency is less than the first modulation frequency.

7. An interference sensor according to claim 1, wherein the means for generating first and second optical beams includes a loop of optical fiber arranged such that the first and second optical beams propagate in opposite directions around the loop.

8. An interference sensor according to claim 1, wherein the analyzer further includes means for varying the sampling frequency.

9. An interference sensor according to claim 1, wherein the analyzer further includes means for electronically modulating the electronic interference signal at a second modulation frequency, wherein the sampling means samples the modulated electronic interference signal at the sampling frequency to obtain the series of sampled data.

10. An interference sensor according to claim 1, wherein the analyzer further comprises means for optically modulating the first and second optical beams at a second modulation frequency, and wherein the extracting means extracts the plurality of aliasing frequency components from the series of sampled data on the basis of at least the second modulation frequency.

11. A vehicle control system comprising:
    an interference sensor for measuring a physical quantity indicative of a condition of a vehicle;
    means for generating a vehicle control signal on the basis of the measured physical quantity; and
    means for controlling the vehicle in response to the vehicle control signal;
    wherein the physical quantity affects an optical phase difference between first and second optical beams, and wherein the interference sensor comprises:
    a source for generating optical radiation;
    means for generating first and second optical beams from the generated optical radiation;
    means for affecting at least one of the first and second optical beams with a physical quantity, thereby affecting an optical phase difference between the first and second optical beams;
    an optical phase modulator for optically modulating the first and second optical beams at a first modulation frequency $f_m$;
    means for causing the modulated first and second optical beams to interfere with each other, thereby generating an optical interference beam;
    means for generating an electronic interference signal from the optical interference beam; and
    an analyzer for analyzing the electronic interference signal to derive the optical phase difference between the first and second optical beams, thereby measuring the physical quantity;

wherein the analyzer includes means for sampling the electronic interference signal at a sampling frequency $f_s$ to obtain a series of sampled data, means for extracting aliasing frequency components $\Delta f$ from the series of sampled data in accordance with a relationship $\Delta f = f_m - nf_s$, where n is an integer, and means for deriving the optical phase difference from a parameter of the extracted aliasing frequency components.

12. A vehicle control system according to claim 11, wherein the means for sampling affects sampling at the sampling frequency less than the first modulation frequency and the means for extracting aliasing frequency components extracts aliasing frequency components so that harmonics thereof always have a frequency less than the first modulation frequency.

13. A vehicle control system according to claim 11, wherein the means for deriving the optical phase difference includes means for demodulating the extracted aliasing frequency components with a frequency signal obtained by sampling the first modulating frequency at the sampling frequency.

14. A method of measuring a physical quantity affecting an optical phase difference between first and second optical beams, comprising the steps of:
generating optical radiation;
generating first and second optical beams from the generated optical radiation;
affecting at least one of the first and second optical beams with a physical quantity, thereby affecting an optical phase difference between the first and second optical beams;
optically modulating the first and second optical beams at a first modulation frequency $f_m$;
causing the modulated first and second optical beams to interfere with each other, thereby generating an optical interference beam;
generating an electronic interference signal from the optical interference beam; and
analyzing the electronic interference signal to derive the optical phase difference between the first and second optical beams, thereby measuring the physical quantity;
wherein the analyzing step includes the steps of sampling the electronic interference signal at a sampling frequency $f_s$ to obtain a series of sampled data, extracting aliasing frequency components $\Delta f$ from the series of sampled data in accordance with a relationship $\Delta f = f_m - nf_s$, where n is an integer, and deriving the optical phase difference from a parameter of the extracted aliasing frequency components.

15. A method according to claim 14, wherein the step of sampling the electronic interference signal at a sampling frequency includes affecting sampling at the sampling frequency less than the first modulation frequency, and the step of extracting aliasing frequency components includes extracting aliasing frequency components so that harmonics thereof always have a frequency less than the first modulation frequency.

16. A method according to claim 14, wherein the step of deriving the optical phase difference includes demodulating the extracted aliasing frequency components with a frequency signal obtained by sampling the first modulating frequency at the sampling frequency.

* * * * *

UNITED STATES PATENT AND TRADEMARK OFFICE
CERTIFICATE OF CORRECTION

PATENT NO.   :   5,264,914
DATED        :   November 23, 1993
INVENTOR(S)  :   OHO, ET AL It is certified that error appears in the above-identified patent and that said Letters Patent is hereby corrected as shown below:

On the title page insert :

[73]    Assignee: Hitachi, Ltd. & Hitachi
                  Cable, Ltd., both of
                  Tokyo, Japan Signed and Sealed this Fourth Day of July, 1995

Attest:

BRUCE LEHMAN

*Attesting Officer*           *Commissioner of Patents and Trademarks*